United States Patent
Chen

(10) Patent No.: US 9,548,844 B2
(45) Date of Patent: Jan. 17, 2017

(54) COMMUNICATION DEVICE AND COMMUNICATION SYSTEM

(71) Applicant: MegaChips Corporation, Osaka-shi (JP)

(72) Inventor: Handa Chen, Osaka (JP)

(73) Assignee: MegaChips Corporation, Osaka-shi (JP)

(*) Notice: Subject to any disclaimer, the term of this patent is extended or adjusted under 35 U.S.C. 154(b) by 365 days.

(21) Appl. No.: 14/234,545

(22) PCT Filed: Sep. 25, 2012

(86) PCT No.: PCT/JP2012/074531
§ 371 (c)(1),
(2) Date: Jan. 23, 2014

(87) PCT Pub. No.: WO2013/058068
PCT Pub. Date: Apr. 25, 2013

(65) Prior Publication Data
US 2014/0160915 A1    Jun. 12, 2014

(30) Foreign Application Priority Data
Oct. 20, 2011    (JP) .................. 2011-230865

(51) Int. Cl.
*H04L 5/00* (2006.01)
*H04B 3/54* (2006.01)
*H04L 27/26* (2006.01)

(52) U.S. Cl.
CPC ............... *H04L 5/0048* (2013.01); *H04B 3/54* (2013.01); *H04L 27/263* (2013.01);
(Continued)

(58) Field of Classification Search
CPC .. H04L 5/0048; H04L 27/2613; H04L 27/263; H04L 27/2634; H04B 3/54; H04B 2203/5416

See application file for complete search history.

(56) References Cited

U.S. PATENT DOCUMENTS 7,039,131 B2    5/2006    Banerjea
7,450,489 B2    11/2008    Sandhu
(Continued)

FOREIGN PATENT DOCUMENTS

CN    101345737 A    1/2009
EP    0 683 576 A1    11/1995
(Continued)

OTHER PUBLICATIONS

Office Action issued Dec. 1, 2015 in Japanese Patent Application No. 2011-230865 (with English language translation).
(Continued)

*Primary Examiner* — Curtis A Alia
(74) *Attorney, Agent, or Firm* — Oblon, McClelland, Maier & Neustadt, L.L.P.

(57) ABSTRACT

A preamble signal is an OFDM signal, and is a real-part signal obtained by removing an imaginary-part signal from a signal in the time domain that is generated by an IFFT process being performed on a signal in the frequency domain obtained by assigning preamble data to subcarriers in accordance with a predetermined arrangement pattern. The predetermined arrangement pattern indicates that preamble data is assigned to any of subcarriers given numbers equal to or less than N/2−1 and the preamble data is not assigned to subcarriers given numbers more than N/2−1, where a plurality of subcarriers are numbered by integers from 0 to N−1 (N is an integer) in ascending order with respect to the center frequency of each subcarrier.

10 Claims, 13 Drawing Sheets

(52) U.S. Cl.
CPC ...... *H04L 27/2613* (2013.01); *H04L 27/2634* (2013.01); *H04B 2203/5416* (2013.01)

(56) References Cited

U.S. PATENT DOCUMENTS

| | | | |
|---|---|---|---|
| 7,940,638 B2 | 5/2011 | Sandhu | |
| 8,406,114 B2 | 3/2013 | Sandhu | |
| 2002/0075830 A1* | 6/2002 | Hartman, Jr. | H04L 1/0003 370/333 |
| 2004/0120412 A1 | 6/2004 | Banerjea | |
| 2005/0141407 A1 | 6/2005 | Sandhu | |
| 2008/0299928 A1* | 12/2008 | Izumi | H04B 1/001 455/226.3 |
| 2009/0034644 A1 | 2/2009 | Sandhu | |
| 2010/0272192 A1 | 10/2010 | Varadarajan et al. | |
| 2011/0188592 A1 | 8/2011 | Sandhu | |

FOREIGN PATENT DOCUMENTS

| | | |
|---|---|---|
| EP | 1 267 537 A2 | 12/2002 |
| JP | 7-321763 A | 12/1995 |
| JP | 10-107758 A | 4/1998 |
| JP | 2001 230751 A | 8/2001 |
| JP | 2006-516071 A | 6/2006 |
| JP | 2006-191238 A | 7/2006 |
| JP | 2007-166571 A | 6/2007 |
| JP | 2007-520118 A | 7/2007 |
| JP | 2009 10928 A | 1/2009 |
| WO | 2004 014008 A2 | 2/2004 |

OTHER PUBLICATIONS

Office Action issued Jun. 23, 2015 in Japanese Patent Application No. 2011-230865 (with partial English translation).
International Preliminary Report on Patentability issued May 1, 2014 in PCT/JP2012/074531 filed Sep. 25, 2012.
Written Opinion issued Oct. 30, 2012 in PCT/JP2012/074531 filed Sep. 25, 2012 with English translation.
International Search Report issued Oct. 30, 2012 in PCT/JP2012/074531 filed Sep. 25, 2012.
Jae-Hyung Song, "Clause 19 changes for sub 10 MHz channel widths for HT operation" IEEE 802.11-10/1314r0, Nov. 1, 2010, 31 Pages.
U.S. Appl. No. 14/236,250, filed Jan. 30, 2014, Chen.
Chinese Office Action dated Jun. 21, 2016, issued in Chinese Patent Application No. 201280051348.2 (with English translation).

* cited by examiner

F I G. 1
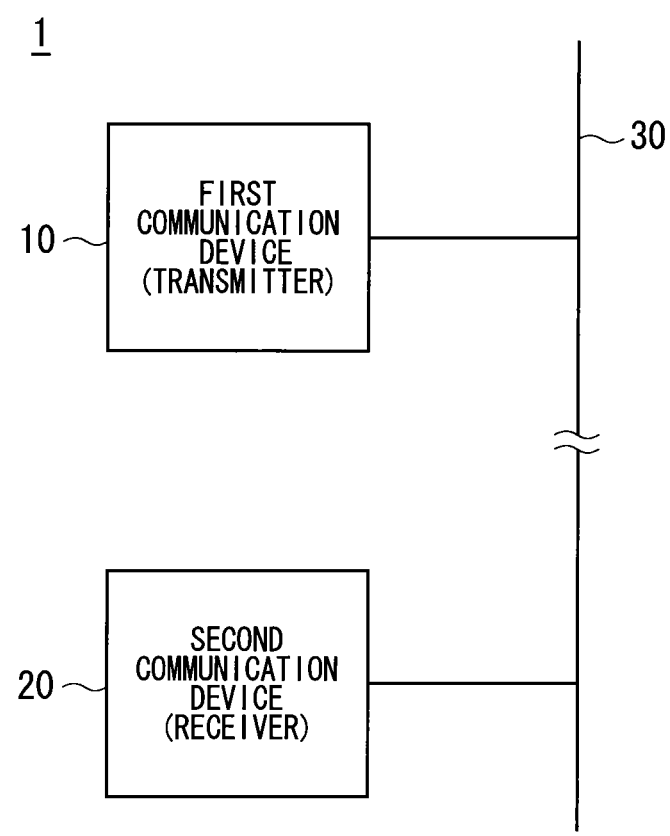

F I G. 5
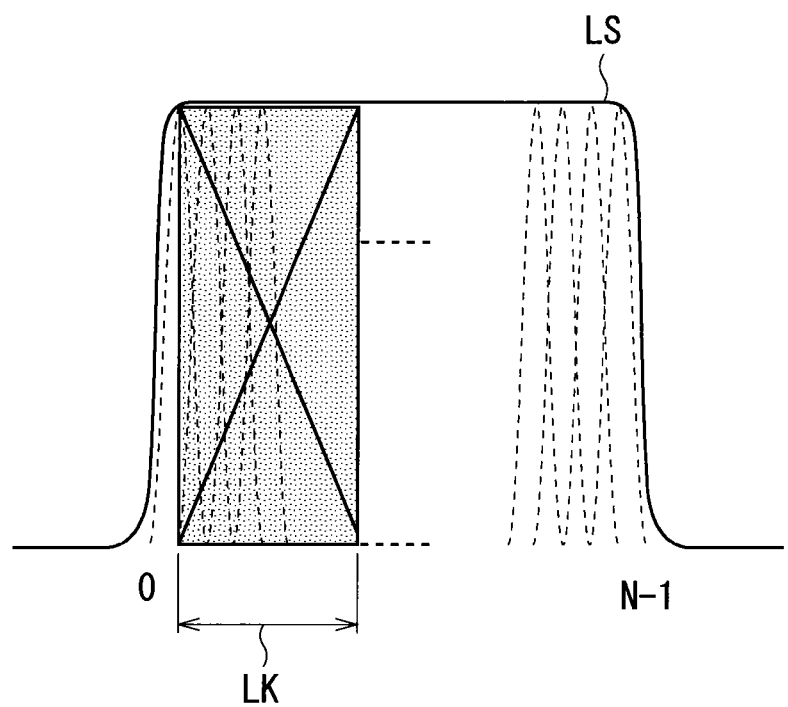

F I G. 6
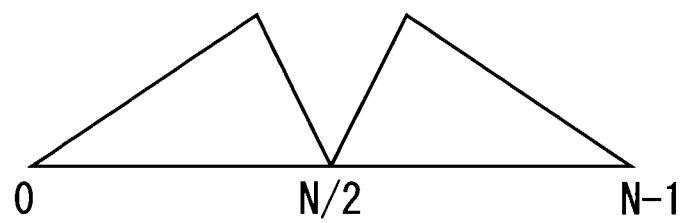
F I G. 7
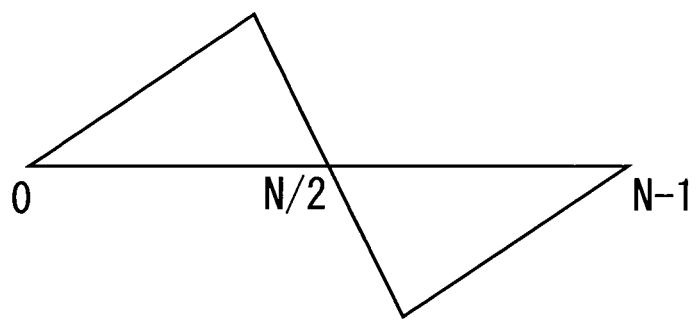

F I G. 1 0
F I G. 1 1
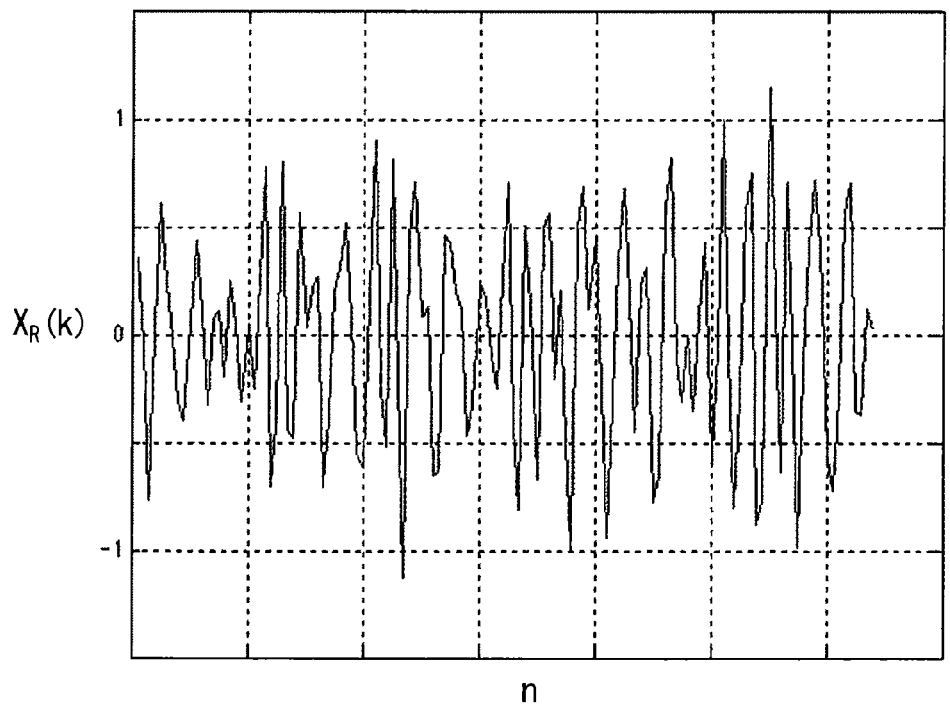

F I G. 1 2
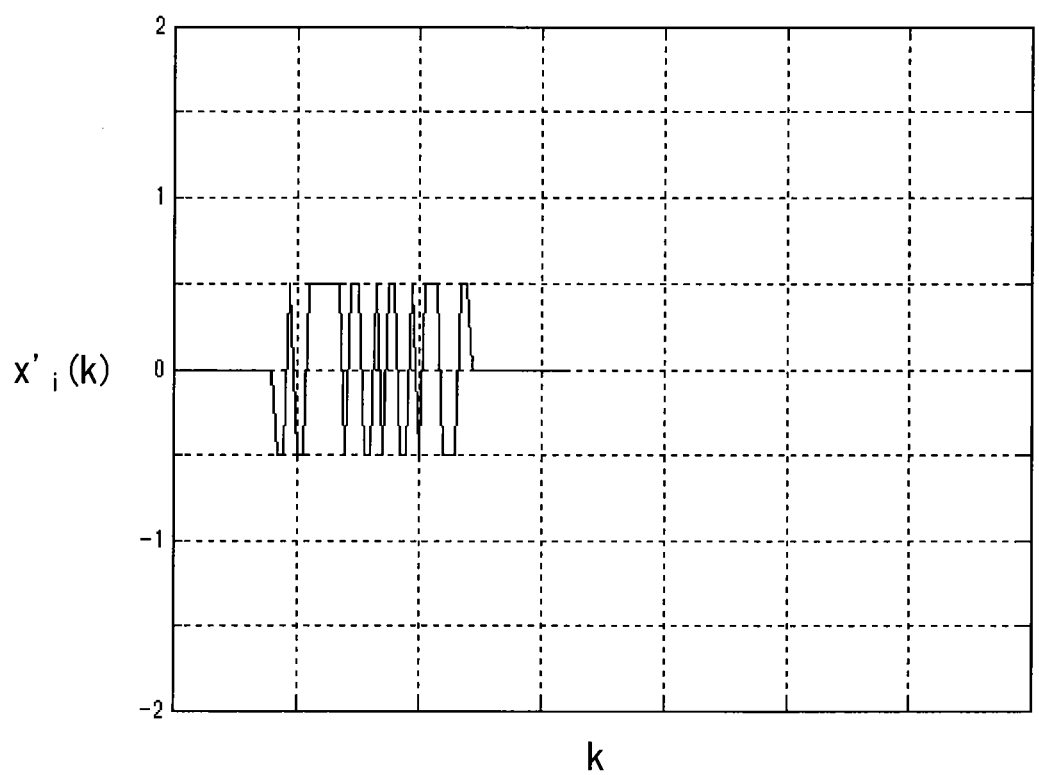

F I G . 1 3

PTs

| NO. | VALUE | NO. | VALUE | NO. | VALUE | NO. | VALUE |
|---|---|---|---|---|---|---|---|
| 0 | 0 | 32 | 0 | 64 | 0 | 96 | 0 |
| 1 | 0 | 33 | 0 | 65 | 0 | 97 | 0 |
| 2 | 0 | 34 | 0 | 66 | 0 | 98 | 0 |
| 3 | 0 | 35 | 0 | 67 | 0 | 99 | 0 |
| 4 | 0 | 36 | 0 | 68 | 0 | 100 | 0 |
| 5 | 0 | 37 | 0 | 69 | 0 | 101 | 0 |
| 6 | 0 | 38 | 0 | 70 | 0 | 102 | 2.82×2 |
| 7 | 0 | 39 | 0 | 71 | 0 | 103 | 0 |
| 8 | 0 | 40 | 0 | 72 | 0 | 104 | 0 |
| 9 | 0 | 41 | 0 | 73 | 0 | 105 | 0 |
| 10 | 0 | 42 | 0 | 74 | 0 | 106 | 0 |
| 11 | 0 | 43 | 0 | 75 | 0 | 107 | 0 |
| 12 | 0 | 44 | 0 | 76 | 0 | 108 | 0 |
| 13 | 0 | 45 | 0 | 77 | 0 | 109 | 0 |
| 14 | 0 | 46 | 0 | 78 | 2.82×2 | 110 | 0 |
| 15 | 0 | 47 | 0 | 79 | 0 | 111 | 0 |
| 16 | 0 | 48 | 0 | 80 | 0 | 112 | 0 |
| 17 | 0 | 49 | 0 | 81 | 0 | 113 | 0 |
| 18 | 0 | 50 | 0 | 82 | 0 | 114 | 0 |
| 19 | 0 | 51 | 0 | 83 | 0 | 115 | 0 |
| 20 | 0 | 52 | 0 | 84 | 0 | 116 | 0 |
| 21 | 0 | 53 | 0 | 85 | 0 | 117 | 0 |
| 22 | 0 | 54 | 0 | 86 | 2.82×2 | 118 | 0 |
| 23 | 0 | 55 | 0 | 87 | 0 | 119 | 0 |
| 24 | 0 | 56 | 0 | 88 | 0 | 120 | 0 |
| 25 | 0 | 57 | 0 | 89 | 0 | 121 | 0 |
| 26 | 0 | 58 | 0 | 90 | 0 | 122 | 0 |
| 27 | 0 | 59 | 0 | 91 | 0 | 123 | 0 |
| 28 | 0 | 60 | 0 | 92 | 0 | 124 | 0 |
| 29 | 0 | 61 | 0 | 93 | 0 | 125 | 0 |
| 30 | 0 | 62 | 0 | 94 | -2.82×2 | 126 | 0 |
| 31 | 0 | 63 | 0 | 95 | 0 | 127 | 0 |

F I G. 1 4
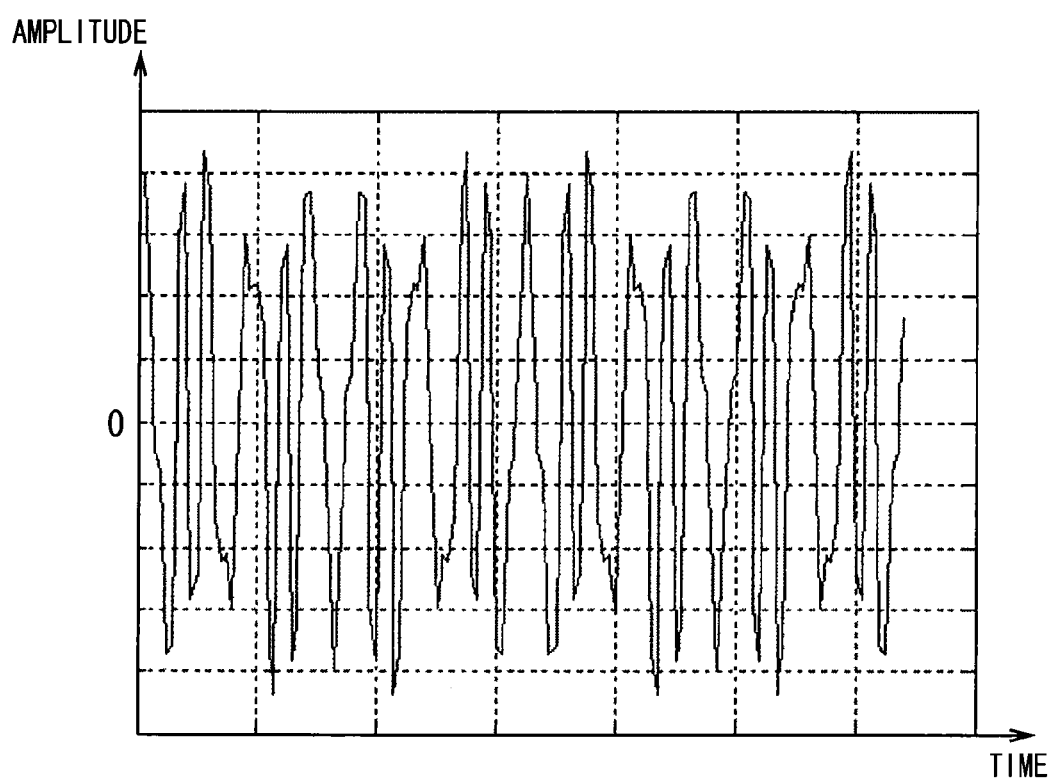

| NO. | VALUE | NO. | VALUE | NO. | VALUE | NO. | VALUE |
|---|---|---|---|---|---|---|---|
| 0 | 0 | 32 | 0 | 64 | 0 | 96 | 1 |
| 1 | 0 | 33 | 0 | 65 | 0 | 97 | -1 |
| 2 | 0 | 34 | 0 | 66 | 0 | 98 | -1 |
| 3 | 0 | 35 | 0 | 67 | 0 | 99 | -1 |
| 4 | 0 | 36 | 0 | 68 | 0 | 100 | -1 |
| 5 | 0 | 37 | 0 | 69 | 0 | 101 | -1 |
| 6 | 0 | 38 | 0 | 70 | 0 | 102 | -1 |
| 7 | 0 | 39 | 0 | 71 | 0 | 103 | -1 |
| 8 | 0 | 40 | 0 | 72 | 0 | 104 | 1 |
| 9 | 0 | 41 | 0 | 73 | 0 | 105 | 1 |
| 10 | 0 | 42 | 0 | 74 | 0 | 106 | -1 |
| 11 | 0 | 43 | 0 | 75 | 1 | 107 | 0 |
| 12 | 0 | 44 | 0 | 76 | -1 | 108 | 0 |
| 13 | 0 | 45 | 0 | 77 | -1 | 109 | 0 |
| 14 | 0 | 46 | 0 | 78 | 1 | 110 | 0 |
| 15 | 0 | 47 | 0 | 79 | -1 | 111 | 0 |
| 16 | 0 | 48 | 0 | 80 | 1 | 112 | 0 |
| 17 | 0 | 49 | 0 | 81 | 1 | 113 | 0 |
| 18 | 0 | 50 | 0 | 82 | 1 | 114 | 0 |
| 19 | 0 | 51 | 0 | 83 | -1 | 115 | 0 |
| 20 | 0 | 52 | 0 | 84 | -1 | 116 | 0 |
| 21 | 0 | 53 | 0 | 85 | 1 | 117 | 0 |
| 22 | 0 | 54 | 0 | 86 | 1 | 118 | 0 |
| 23 | 0 | 55 | 0 | 87 | 1 | 119 | 0 |
| 24 | 0 | 56 | 0 | 88 | -1 | 120 | 0 |
| 25 | 0 | 57 | 0 | 89 | -1 | 121 | 0 |
| 26 | 0 | 58 | 0 | 90 | -1 | 122 | 0 |
| 27 | 0 | 59 | 0 | 91 | -1 | 123 | 0 |
| 28 | 0 | 60 | 0 | 92 | 1 | 124 | 0 |
| 29 | 0 | 61 | 0 | 93 | -1 | 125 | 0 |
| 30 | 0 | 62 | 0 | 94 | 1 | 126 | 0 |
| 31 | 0 | 63 | 0 | 95 | 1 | 127 | 0 |

F I G. 1 6
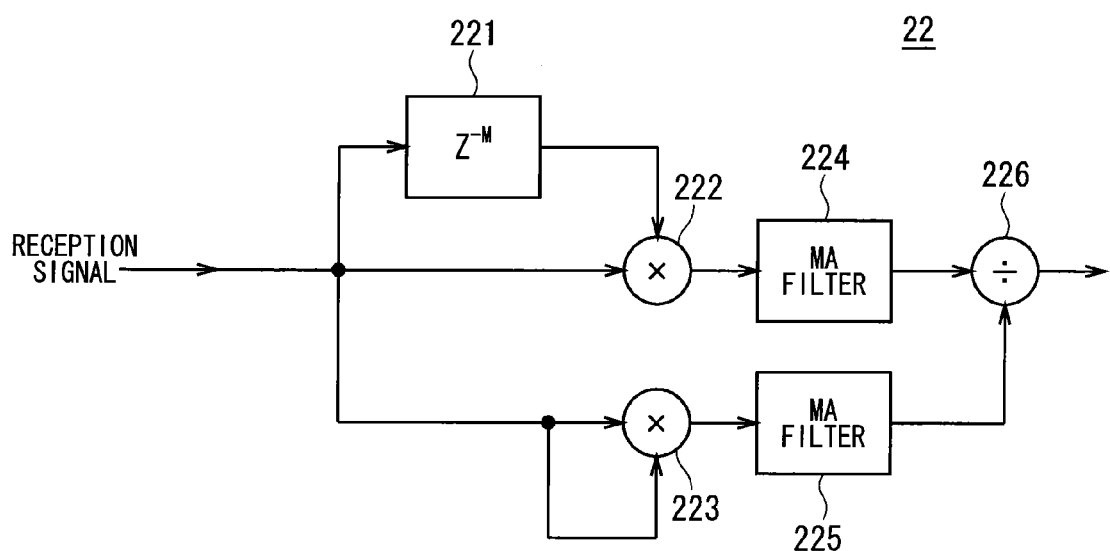

COMMUNICATION DEVICE AND COMMUNICATION SYSTEM

TECHNICAL FIELD

The present invention relates to a communication technology.

BACKGROUND ART

There is a technique of performing communication by using an OFDM (Orthogonal Frequency Division Multiplexing) signal constituted of a plurality of subcarriers orthogonal to each other (for example, Patent Document 1).

An ordinary communication device (transmitter) for transmitting the OFDM signal is configured to perform a primary modulation for mapping transmission data on a complex plane to thereby obtain a complex symbol, and then perform an inverse fast Fourier transform (IFFT) on the complex symbol, to generate a baseband OFDM signal. Then, the communication device performs a predetermined process, such as a quadrature modulation and a frequency conversion, on the baseband OFDM signal, to generate a carrier-band OFDM signal. The communication device outputs the carrier-band OFDM signal as a communication signal to a channel.

On the other hand, an ordinary communication device (receiver) for receiving the OFDM signal is configured to perform a predetermined process, such as a frequency conversion and a quadrature detection, on the reception signal, to generate a baseband OFDM signal. Then, the communication device performs a demodulation process, such as a fast Fourier transform (FFT) and a demapping process, on the baseband OFDM signal, to modulate data.

In a case where communication is performed in packets, the receiver does not recognize when the transmitter transmits a packet signal, and in other words, when a packet signal arrives at the receiver. Therefore, the receiver has to stand by for the arrival of a packet signal, and detect a packet signal from signals received during the stand-by period. Such a process for detecting a packet signal is performed by using a preamble signal that is included in the packet signal.

PRIOR-ART DOCUMENTS

Patent Documents

Patent Document 1: Japanese Patent Application Laid-Open No. 2001-230751

SUMMARY OF THE INVENTION

Problems to be Solved by the Invention

In each of these communication devices configured to perform communication in packets, it is preferable that downsizing of the communication device is achieved without impairing a communication function for communicating information.

Therefore, an object of the present invention is to provide a technique that enables downsizing of a communication device to be achieved.

Means for Solving the Problems

A first aspect of a communication device according to the present invention includes: a generation section configured to generate a transmission signal including transmission data; and a transmission section configured to transmit a packet signal obtained by adding a preamble signal to the transmission signal. The preamble signal is an OFDM signal including a plurality of subcarriers. The preamble signal is a real-part signal obtained by removing an imaginary-part signal from a signal in time domain that is generated by an IFFT process being performed on a signal in frequency domain obtained by assigning preamble data to subcarriers in accordance with a predetermined arrangement pattern. The predetermined arrangement pattern indicates that the preamble data is assigned to any of subcarriers given numbers equal to or less than $N/2-1$ and the preamble data is not assigned to subcarriers given numbers more than $N/2-1$, or that the preamble data is assigned to any of subcarriers given numbers more than $N/2-1$ and the preamble data is not assigned to subcarriers given numbers equal to or less than $N/2-1$, where the plurality of subcarriers are numbered by integers from 0 to $N-1$ (N is an integer) in ascending order with respect to the center frequency of each subcarrier. The transmission section is configured to transmit the packet signal without performing quadrature modulation thereon.

A second aspect of the communication device according to the present invention is the first aspect, in which: the preamble signal includes a short preamble signal corresponding to one OFDM symbol as a unit; and a predetermined arrangement pattern for the short preamble signal indicates that the preamble data is assigned to, in subcarriers that are given consecutive numbers, an even number of subcarriers that are at regular intervals and spaced apart from one another by an odd number of subcarriers.

A third aspect of the communication device according to the present invention is the first or second aspect, in which: the preamble signal includes a short preamble signal corresponding to one OFDM symbol as a unit; and a predetermined arrangement pattern for the short preamble signal indicates that the preamble data is assigned to subcarriers such that the PAPR (Peak to Average Power Ratio) of the short preamble signal is close to one.

A fourth aspect of the communication device according to the present invention is any of the first to third aspects, in which: the preamble signal includes a short preamble signal corresponding to one OFDM symbol as a unit; and a predetermined arrangement pattern for the short preamble signal indicates that the preamble data is assigned to subcarriers such that power of the short preamble signal is higher by 6 dB than power of the transmission signal of one OFDM symbol.

A fifth aspect of the communication device according to the present invention is any of the first to fourth aspects, in which: the preamble signal includes a long preamble signal corresponding to one OFDM symbol as a unit; and a predetermined arrangement pattern for the long preamble signal indicates that the preamble data is assigned to subcarriers such that the PAPR of the long preamble signal is close to one.

A sixth aspect of the communication device according to the present invention is any of the first to fifth aspects, in which: the preamble signal includes a long preamble signal corresponding to one OFDM symbol as a unit; and a predetermined arrangement pattern for the long preamble signal indicates that the preamble data that is a PRBS (Pseudo Random Binary (Bit) Sequence) is assigned to subcarriers.

A seventh aspect of the communication device according to the present invention includes: a generation section configured to generate a transmission signal including transmission data; and a transmission section configured to transmit a packet signal obtained by adding a preamble signal to the transmission signal. The preamble signal includes a short preamble signal corresponding to one OFDM symbol as a unit. The short preamble signal is a real-part signal obtained by removing an imaginary-part signal from a signal in time domain that is generated by an IFFT process being performed on a signal in frequency domain obtained by assigning preamble data to subcarriers included in the short preamble signal in accordance with a predetermined arrangement pattern. The predetermined arrangement pattern for the short preamble signal indicates that preamble data of "2.82×2" is assigned to a subcarrier No. 78, a subcarrier No. 86, and a subcarrier No. 102, and preamble data of "−2.82×2" is assigned to a subcarrier No. 94, where 128 subcarriers included in the short preamble signal are numbered by integers from 0 to 127 in ascending order with respect to the center frequency of each subcarrier. The transmission section is configured to transmit the packet signal without performing quadrature modulation.

An eighth aspect of the communication device according to the present invention includes: a generation section configured to generate a transmission signal including transmission data; and a transmission section configured to transmit a packet signal obtained by adding a preamble signal to the transmission signal. The preamble signal includes a long preamble signal corresponding to one OFDM symbol as a unit. The long preamble signal is a real-part signal obtained by removing an imaginary-part signal from a signal in time domain that is generated by an IFFT process being performed on a signal in frequency domain obtained by assigning preamble data to subcarriers included in the long preamble signal in accordance with a predetermined arrangement pattern. The predetermined arrangement pattern for the long preamble signal indicates that preamble data of "1" is assigned to a subcarrier No. 75, a subcarrier No. 78, a subcarrier No. 80, a subcarrier No. 81, a subcarrier No. 82, a subcarrier No. 85, a subcarrier No. 86, a subcarrier No. 87, a subcarrier No. 92, a subcarrier No. 94, a subcarrier No. 95, a subcarrier No. 9, a subcarrier No. 104, and a subcarrier No. 105, and preamble data of "−1" is assigned to a subcarrier No. 76, a subcarrier No. 77, a subcarrier No. 79, a subcarrier No. 83, a subcarrier No. 84, a subcarrier No. 88, a subcarrier No. 89, a subcarrier No. 90, a subcarrier No. 91, a subcarrier No. 93, a subcarrier No. 97, a subcarrier No. 98, a subcarrier No. 99, a subcarrier No. 100, a subcarrier No. 101, a subcarrier No. 102, a subcarrier 103, and a subcarrier No. 106, where 128 subcarriers included in the long preamble signal are numbered by integers from 0 to 127 in ascending order with respect to the center frequency of each subcarrier. The transmission section is configured to transmit the packet signal without performing quadrature modulation.

A ninth aspect of the communication device according to the present invention includes: a reception section configured to receive a packet signal; and a preamble detection section configured to detect a preamble signal included in the packet signal. The packet signal is a signal of a real number on which no quadrature modulation has been performed in a transmitter. The preamble detection section is configured to detect the preamble signal by using a correlation computation result that is obtained by performing correlation computation on the packet signal. The preamble detection section does not include a complex conjugate unit for generating a complex conjugate signal of the received preamble signal.

A communication system according to the present invention includes: a first communication device; and a second communication device configured to communicate with the first communication device. The first communication device includes: a generation section configured to generate a transmission signal including transmission data; and a transmission section configured to transmit a packet signal obtained by adding a preamble signal to the transmission signal. The preamble signal is an OFDM signal including a plurality of subcarriers. The preamble signal is a real-part signal obtained by removing an imaginary-part signal from a signal in time domain that is generated by an IFFT process being performed on a signal in frequency domain obtained by assigning preamble data to subcarriers in accordance with a predetermined arrangement pattern. The predetermined arrangement pattern indicates that the preamble data is assigned to any of subcarriers given numbers equal to or less than N/2−1 and the preamble data is not assigned to subcarriers given numbers more than N/2−1, or that the preamble data is assigned to any of subcarriers given numbers more than N/2−1 and the preamble data is not assigned to subcarriers given numbers equal to or less than N/2−1, where the plurality of subcarriers are numbered by integers from 0 to N−1 (N is an integer) in ascending order with respect to the center frequency of each subcarrier. The transmission section is configured to transmit the packet signal without performing quadrature modulation. The second communication device includes: a reception section configured to receive the packet signal; and a preamble detection section configured to detect the preamble signal included in the packet signal. The preamble detection section is configured to detect the preamble signal by using a correlation computation result that is obtained by performing correlation computation on the packet signal. The preamble detection section does not include a complex conjugate unit for generating a complex conjugate signal of the received preamble signal.

Effects of the Invention

The present invention enables downsizing of a communication device.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 A configuration diagram of a communication system according to an embodiment.

FIG. 5 A diagram showing an OFDM signal including subcarriers having subcarrier Nos. "0" to "N−1".

FIG. 6 A conceptual diagram showing that an input signal inputted to an IFFT unit is an even function.

FIG. 7 A conceptual diagram showing that an input signal inputted to the IFFT unit is an odd function.

FIG. 10 A diagram showing a result of the computer simulation.

FIG. 11 A diagram showing a result of the computer simulation.

FIG. 12 A diagram showing a result of the computer simulation.

FIG. 13 A diagram showing an example of a data arrangement pattern that is used in generation of a STF.

FIG. 14 A diagram showing a waveform of the STF generated by using the data arrangement pattern shown in FIG. 13.

FIG. 15 A diagram showing an example of a data arrangement pattern that is used in generation of a LTF.

FIG. 16 A diagram showing a configuration of a correlation computation part provided in a preamble detection unit.

EMBODIMENT FOR CARRYING OUT THE INVENTION

Figure 2:
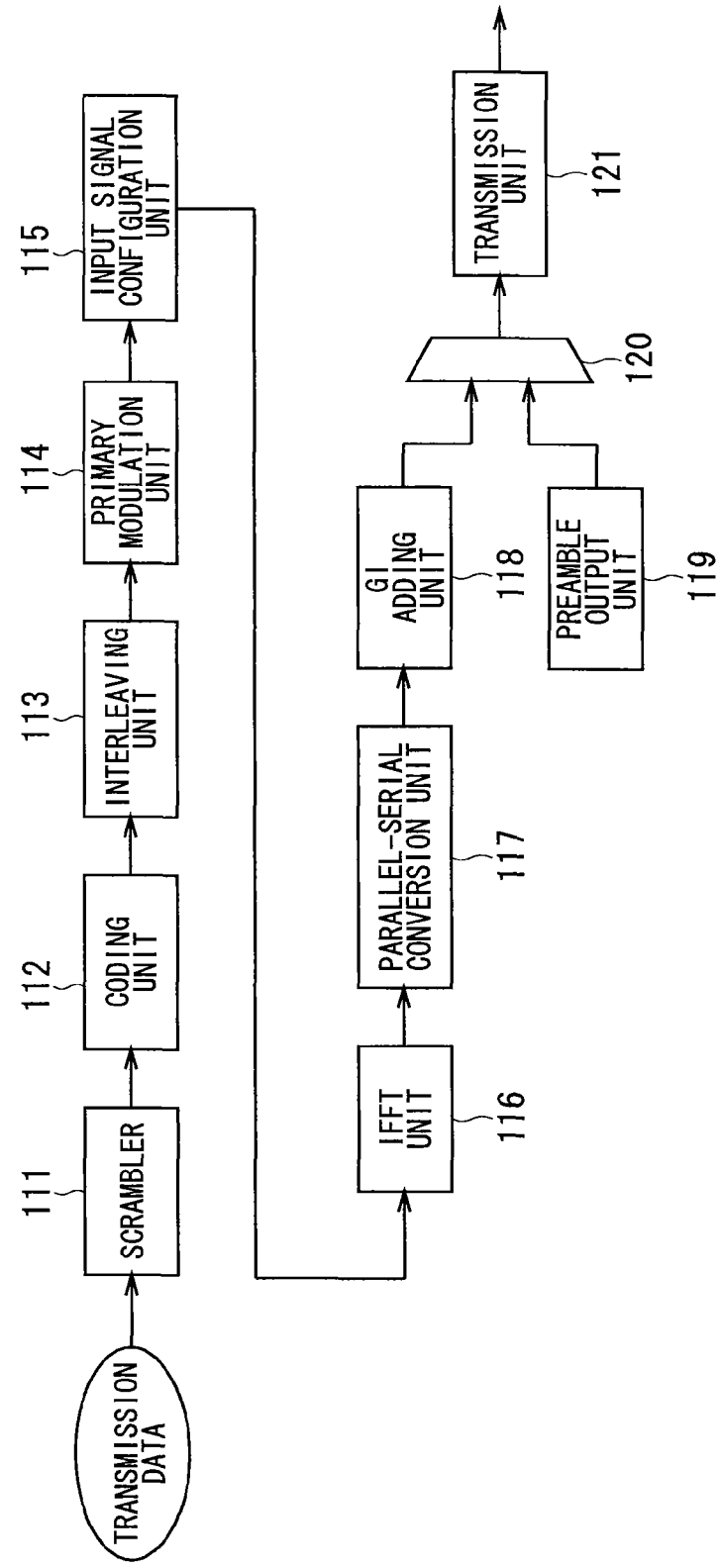
FIG. 2 A diagram showing a configuration of a transmitter according to this embodiment.

In the following, an embodiment will be described with reference to the drawings.

<Embodiment>

[1. Configuration of Communication System]

FIG. 1 is a configuration diagram of a communication system 1 according to this embodiment.

As shown in FIG. 1, the communication system 1 includes a first communication device 10 and a second communication device 20. The first communication device 10 and the second communication device 20 included in the communication system 1 are communicable with each other via wired communication. A channel 30 that electrically connects the first communication device 10 to the second communication device 20 may be an ordinary communication line, or alternatively may be a power line. In a case where the channel is a power line, the first communication device 10 and the second communication device 20 perform communication via power line communication (PLC: power line communication). This embodiment illustrates the communication system 1 configured to perform communication by means of power line communication.

The wired communication between the communication devices 10 and 20 is performed with use of an OFDM (Orthogonal Frequency Division Multiplexing) signal obtained as a result of synthesis of a plurality of subcarriers that are orthogonal to each other on a frequency axis. The OFDM signal is separated by a certain time unit, and transmitted on a packet basis.

In the communication system 1, data transmission is performed by using, among all subcarriers included in the OFDM signal, subcarriers included in a predetermined band. Details of the subcarriers used for data transmission will be described later.

In a case illustrated below, the first communication device 10 functions as a transmitter and the second communication device 20 functions as a receiver. However, this is not limiting. That is, the first communication device 10 has at least a transmission function, and may have a reception function in addition to the transmission function. Likewise, the second communication device 20 has at least a reception function, and may have a transmission function in addition to the reception function.

[2. Configuration of Transmitter]

Next, a configuration of the transmitter 10 included in the communication system 1 will be described. FIG. 2 is a diagram showing a configuration of the transmitter 10 according to this embodiment.

As shown in FIG. 2, the transmitter 10 includes a scrambler 111, a coding unit 112, an interleaving unit (interleaver) 113, a primary modulation unit 114, an input signal configuration unit 115, an IFFT (inverse fast Fourier transform) unit 116, a parallel/serial conversion unit (parallel-serial conversion unit) 117, a GI adding unit 118, a preamble output unit 119, a packet configuration unit 120, and a transmission unit 121.

To be specific, the scrambler 111 performs a scrambling process on data to be transmitted (also referred to as "sent data" or "transmission data"), for scrambling the data and rearranging the order thereof. The transmission data on which the scrambling process has been performed by the scrambler 111 is inputted to the coding unit 112.

The coding unit 112 performs redundancy coding for error correction on the transmission data on which the scrambling process has been performed. For example, a convolutional code whose original code has a constraint length of k=7 and a code rate of ½ is used for the redundancy coding. A bit sequence of the transmission data outputted from the coding unit 112 is inputted to the interleaving unit 113.

The interleaving unit 113 performs bit interleave for rearranging the bit sequence of the transmission data, in order to prevent an unequal concentration of an error in one symbol. The transmission data outputted from the interleaving unit 113 is inputted to the primary modulation unit 114.

The primary modulation unit 114 maps (associates) the transmission data in a subcarrier on a symbol basis in accordance with a predetermined modulation scheme (for example, QPSK, 16 QAM).

Herein, the symbol (Symbol) represents a configuration unit of a segment of transmission data that is superimposed on the carrier wave (subcarrier), which is defined for each modulation scheme. To avoid confusion with an OFDM symbol which will be described later, the symbol herein will be also referred to as a data symbol or a complex symbol. For example, in QPSK, transmission data that can be transmitted in one symbol (one data symbol) is two bits.

The input signal configuration unit 115 has a function for converting the data symbol inputted from the primary modulation unit 114 into a predetermined number of parallel data units, in order that a data signal made of a buffer and the like and including the transmission data be dispersedly superimposed on a subcarrier.

More specifically, in the communication system 1, data transmission is performed by using, among all subcarriers included in the OFDM signal, subcarriers included in a predetermined band, as described above. Therefore, the input signal configuration unit 115 assigns the data signal to the subcarriers included in the predetermined band, and assigns 0 (zero) to the other subcarriers different from the subcarriers included in the predetermined band, to thereby generate parallel data units, and outputs the parallel data units to the IFFT unit 116.

In this manner, the input signal configuration unit 115 functions as an assignment means for assigning a data signal to each subcarrier. Details of the predetermined band including the subcarriers that are used for data transmission will be described later.

The IFFT unit 116 performs an inverse fast Fourier transform on the parallel data units inputted from the input signal configuration unit 115, to convert data in the frequency domain to data in the time domain. The data in the frequency domain, which is inputted from the input signal configuration unit 115, is data of the amplitude and phase of each subcarrier. The IFFT unit 116 generates time data corresponding to one OFDM symbol from amplitude phase data of each subcarrier.

The time data generated by the IFFT unit 116 is complex data in the time domain. The IFFT unit 116 generates time data of I-axis component (in-phase component, real component) and time data of Q-axis component (quadrature component, imaginary component).

In this embodiment, among the complex data in the time domain generated by the IFFT unit 116, the time data of the I-axis component is inputted to the parallel-serial conversion unit 117 while the time data of the Q-axis component is discarded.

The parallel-serial conversion unit 117 has a function for converting parallel data inputted from the IFFT unit 116 into serial data. The serial data outputted from the parallel-serial conversion unit 117 is, as an OFDM signal in the baseband (baseband OFDM signal), inputted to the GI adding unit 118.

The GI adding unit 118 performs a process for adding a guard interval (GI) to the baseband OFDM signal inputted from the parallel-serial conversion unit 117, and outputs the baseband OFDM signal having the GI added thereto to the packet configuration unit 120.

The preamble output unit 119 has a function for outputting a preamble (Preamble) signal (preamble) that is used in the receiver side for a detection process for detecting a reception signal and various types of synchronization processes including a symbol timing synchronization.

More specifically, the preamble output unit 119 includes a storage unit (not shown) storing a preamble signal to be outputted, and outputs the preamble signal stored in the storage unit to the outside. The preamble signal stored in the storage unit is a signal obtained by taking a real part from a signal in the time domain that is generated as a result of an IFFT process being performed on a signal in the frequency domain obtained by arranging (assigning) data concerning a preamble (also referred to as "preamble data signal" or "preamble data") to each subcarrier in accordance with a predetermined arrangement pattern. The preamble signal is generated in advance, and stored in the storage unit. The pattern (also referred to as "data arrangement pattern" or "data assignment pattern") of arrangement of the preamble data to each subcarrier, which is used in generation of the preamble signal, will be described later.

The packet configuration unit 120 adds the preamble signal to the OFDM signal outputted from the GI adding unit 118, to generate a signal of a packet unit (also referred to as "packet signal").

Figure 3:
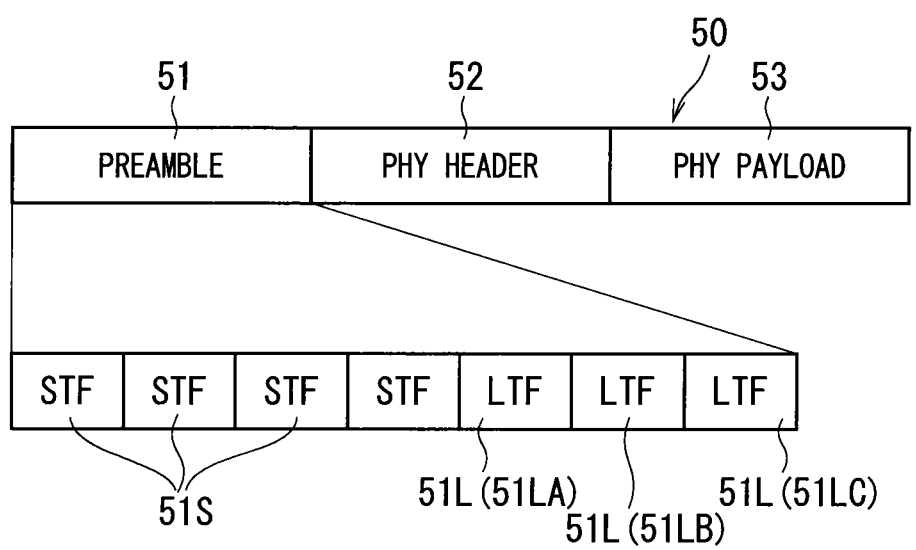
FIG. 3 A diagram showing a configuration of a packet.

A configuration of the packet (packet signal) generated by the packet configuration unit 120 will be described. FIG. 3 is a diagram showing a configuration of the packet.

As shown in FIG. 3, a packet 50 includes a preamble 51, a PHY (physical layer) header 52 subsequent to the preamble 51, and a PHY payload 53 subsequent to the PHY header 52.

The preamble 51 includes four successive short training fields (STFs) 51S and three long training fields (LTFs) 51L following the STFs 51S. The four STFs 51S have the same content, and the three LTFs 51L have the same content. Each of the STFs 51S and the LTFs 51L is a signal of one OFDM symbol.

The STF 51S is configured such that a signal having a predefined fixed pattern is repeated predetermined number of times (for example, four times) in a predetermined cycle. That is, the STF 51S is a signal having cyclicity (to be exact, a signal having symmetricity). The STF 51S is used for, in the receiver side, detecting a signal on a packet basis (packet signal) transmitted from the transmitter side, and used for, in the receiver side, performing an automatic gain control (AGC) that corrects level of the reception signal.

Among the three LTFs 51L, an initial LTF 51LA and a second LTF 51LB are used for a fine adjustment of a timing (symbol timing) of execution of the FFT process in the receiver side. Among the three LTFs 51L, the final LTF 51LC is used for estimation of a channel.

In another conceivable preamble configuration, two LTFs are provided in the preamble with a guard interval added before the two LTFs, and an initial LTF is used for fine adjustment of a symbol timing while a second LTF51 is used for estimation of a channel. In this configuration, a shift in the symbol timing corresponding to the guard interval is allowed. In contrast, the configuration of this embodiment, in which three LTFs 51L are provided without a guard interval and the initial LTF 51LA and the second LTF 51LB are used for fine adjustment of a symbol timing, allows a shift in the symbol timing corresponding to one OFDM symbol.

The PHY header 52 includes header information such as the transmission speed and the data length of transmission data which will be subsequently transmitted.

The PHY payload 53 includes transmission data to be transmitted.

The packet configuration unit 120 generates the packet signal including the preamble 51 having the STFs 51S and LTFs 51L, the PHY header 52, and the PHY payload 53. The STF is also called "short training symbol" or "short preamble signal", and the LTF is also called "long training symbol" or "long preamble signal".

Referring to FIG. 2 again for the description of the transmitter 10, the transmission unit 121 performs a DA conversion process for converting the packet signal in digital form generated by the packet configuration unit 120 into a packet signal in analog form, and outputs, as a communication signal, the packet signal obtained as a result of the DA conversion process. The communication signal outputted from the transmission unit 121 is transmitted to the receiver 20 via the channel 30.

Thus, in the transmitter 10, among the complex data in the time domain generated by the IFFT unit 116, the time data of the imaginary component is discarded, and the OFDM signal (also referred to as "real-part OFDM signal") generated based on the time data of the real component is transmitted as the communication signal. This enables the transmitter 10 to transmit a real-number signal without performing any quadrature modulation. Therefore, a configuration for performing a quadrature modulation need not be provided in the transmitter 10.

In a conventional transmitter, a quadrature modulation is performed on a baseband OFDM signal on which the IFFT process has been performed, and, among the signal obtained as a result of the quadrature modulation, a signal of a real number part is transmitted as a carrier-band OFDM signal. In the transmitter 10 of this embodiment, on the other hand, no quadrature modulation is performed on the baseband OFDM signal on which the IFFT process has been performed, and a signal of a real number part (real-part signal) is extracted from the baseband OFDM signal, and this signal of the real number part is transmitted.

The transmitter 10 configured as described above can be also expressed as including a generation means for generating a transmission signal including transmission data (in the above description, the baseband OFDM signal), and a transmission means for generating a packet signal by adding a preamble signal to the transmission signal and then transmitting the packet signal. That is, the generation means for generating the transmission signal including the transmission data includes the scrambler 111, the coding unit 112, the interleaving unit 113, the primary modulation unit 114, the input signal configuration unit 115, the IFFT unit 116, and the parallel-serial conversion unit 117; and the transmission means includes the preamble output unit 119 and the transmission unit 121.

[3. Configuration of Receiver]

Figure 4:
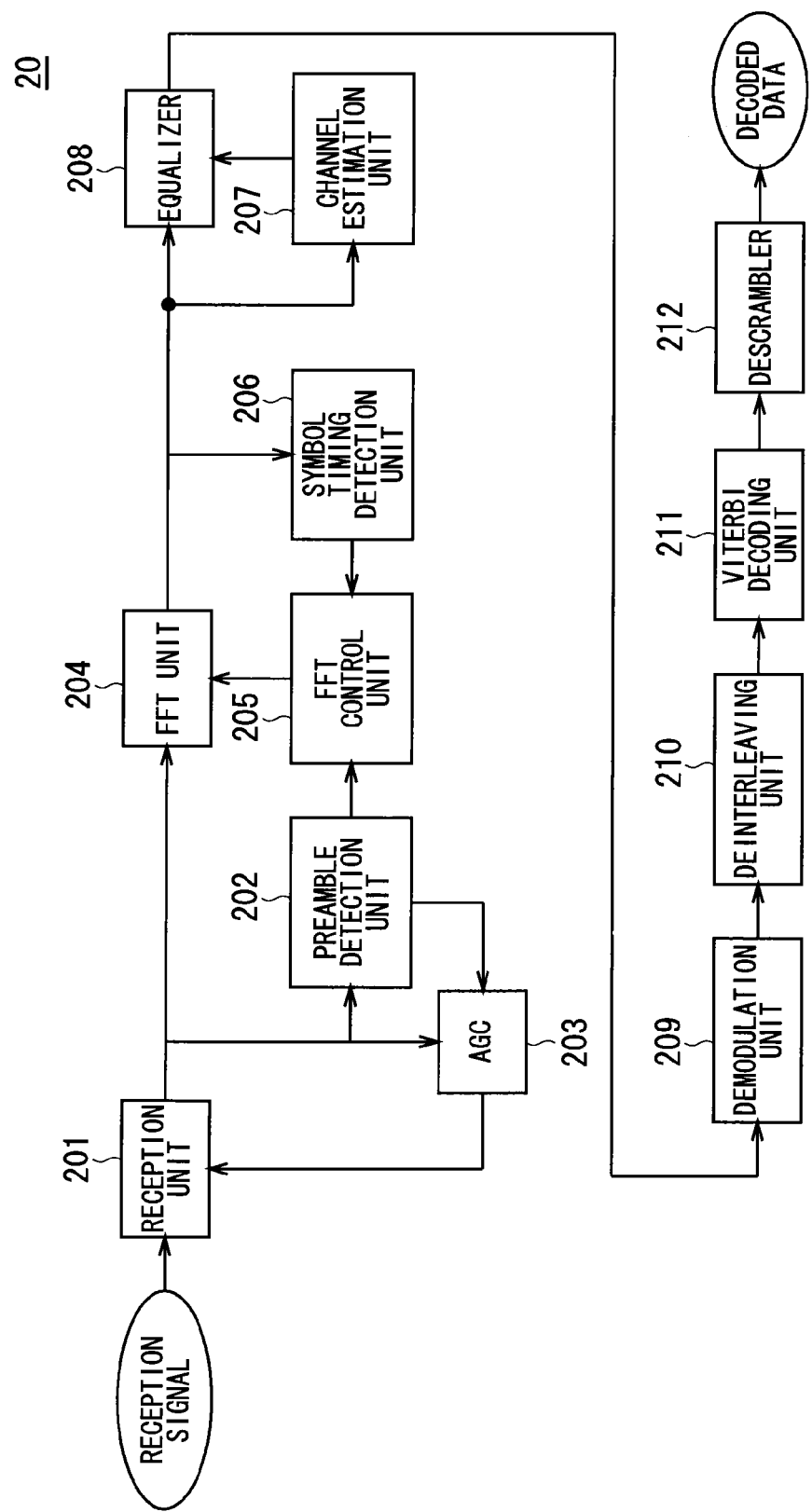
FIG. 4 A diagram showing a configuration of a receiver according to this embodiment.

Next, the receiver 20 included in the communication system 1 will be described. FIG. 4 is a diagram showing a configuration of the receiver 20 according to this embodiment.

As shown in FIG. 4, the receiver 20 includes a reception unit 201, a preamble detection unit 202, an AGC (automatic gain control) unit 203, an FFT (fast Fourier transform) unit 204, an FFT control unit 205, a symbol timing detection unit 206, a channel estimation unit 207, an equalizer 208, a demodulation unit 209, a deinterleaving unit 210, a Viterbi decoding unit 211, and a descrambler 212.

The communication signal transmitted from the transmitter 10 is sent to the receiver 20 via the channel 30. The receiver 20 receives the communication signal in the reception unit 201.

The reception unit 201 performs a filtering process, an AD conversion process, and the like, on the received communication signal (reception signal). Then, the reception unit 201 outputs the reception signal in digital form to the preamble detection unit 202, the AGC (automatic gain control) unit 203, and the FFT unit 204.

The communication signal used in this communication system 1 is a signal on which no quadrature modulation has been performed on the transmitter side. Therefore, a quadrature detection is not necessary in the receiver side. Accordingly, the receiver 20 of this embodiment does not include a configuration for the quadrature detection, and a low pass filter for removing a signal of a high frequency component generated as a result of the quadrature detection.

The preamble detection unit 202 performs a preamble signal detection process for detecting a preamble signal included in the reception signal. More specifically, the preamble detection unit 202 includes a correlation computation part (which will be described later). The correlation computation part performs correlation computation on the reception signal, and the preamble detection unit 202 detects a preamble signal by using a result of the correlation computation.

Upon detection of a preamble signal, the preamble detection unit 202 outputs a signal (preamble detection signal) indicating detection of the preamble signal to the AGC unit 203 and the FFT control unit 205.

In accordance with the input of the preamble detection signal from the preamble detection unit 202, the AGC unit 203 performs gain adjustment so as to cause signals at different reception levels to be signals at a proper level.

The FFT control unit 205 outputs a control signal to the FFT unit 204 based on a symbol timing, to control a timing of execution of an FFT process that is performed by the FFT unit 204.

Upon input of the preamble detection signal from the preamble detection unit 202, the FFT control unit 205 identifies the symbol timing based on a timing of detection of the preamble signal. Since the configuration of a packet signal is known, the FFT control unit 205 is able to identify the symbol timing based on the timing of detection of the preamble signal. The symbol timing identified based on the timing of detection of the preamble signal in the FFT control unit 205 is a provisional symbol timing, and a fine adjustment is made on the symbol timing later.

The symbol timing detection unit 206 detects a formal symbol timing by using the LTF 51L included in the preamble 51 of a packet. The formal symbol timing detected by the symbol timing detection unit 206 is notified to the FFT control unit 205. Upon notification of the formal symbol timing, the FFT control unit 205 controls the timing of execution of the FFT process based on the formal symbol timing.

The FFT unit 204 performs a so-called multicarrier demodulation process for performing a fast Fourier transform on the reception signal to convert a signal in the time domain into a signal in the frequency domain. The reception signal obtained as a result of the multicarrier demodulation process, which is outputted from the FFT unit 204, is inputted to the channel estimation unit 207 and the equalizer 208.

The FFT unit 204 receives a real-number signal and an imaginary-number signal. Here, in the receiver 20, a signal based on the reception signal on which a sequence of reception processes have been performed by the reception unit 201 is inputted as the real-number signal to the FFT unit 204. As the imaginary-number signal, for example, zero is inputted.

The channel estimation unit (channel estimation means) 207 estimates characteristics of the channel by comparing the preamble signal included in the reception signal against a known preamble signal that is stored in advance in the storage unit of the receiver 20. The channel characteristics (also referred to as "estimated channel characteristics") estimated by the channel estimation unit 207 is outputted to the equalizer 208.

The equalizer (equalization processing means) 208 performs an equalization process for dividing the reception signal by the estimated channel characteristics corresponding to this reception signal and thereby removing a channel distortion. The reception signal obtained as a result of the equalization process, which is outputted from the equalizer 208, is outputted to the demodulation unit 209.

The demodulation unit 209 performs a subcarrier demodulation process such as a demapping process on the reception signal obtained as a result of the equalization process, and outputs the reception signal thus modulated to the deinterleaving unit 210.

The deinterleaving unit 210 performs deinterleaving for restoring the reception signal that has been rearranged in the transmitter side. The reception signal thus deinterleaved is outputted to the Viterbi decoding unit 211. The Viterbi decoding unit 211 performs error correction decoding on the reception signal.

The descrambler 212 performs a descrambling process on the reception signal outputted from the Viterbi decoding unit 211. As a result, decoded data corresponding to the transmission data is generated.

In the receiver 20, as thus far described, no quadrature detection is performed, and the multicarrier demodulation process is performed on the reception signal in the FFT unit 204.

In the receiver 20 of this embodiment, a modulation means that obtains the decoded data (reception data) includes the preamble detection unit 202, the FFT unit 204, the FFT control unit 205, the symbol timing detection unit 206, the channel estimation unit 207, the equalizer 208, the demodulation unit 209, the deinterleaving unit 210, the Viterbi decoding unit 211, and the descrambler 212.

[4. Aspect of Use of Subcarriers of OFDM Signal]

Next, a detailed description will be given to an aspect of use of subcarriers in the OFDM signal used in the above-described communication system 1. FIG. 5 is a diagram showing an OFDM signal LS including subcarriers having subcarrier Nos. "0" to "N−1".

In the communication system 1, as described above, data transmission is performed by using, among all subcarriers included in the OFDM signal, subcarriers included in a predetermined band.

To be specific, the subcarriers used for data transmission are subcarriers that are given the numbers equal to or less than N/2−1, where N subcarriers (N is an integer) included in the OFDM signal are numbered by integers from 0 to N−1 in ascending order with respect to the frequency (center frequency) of each subcarrier.

Among the subcarriers, the subcarriers used for data transmission will be also referred to as "use subcarrier" or "transmission subcarrier". For example, in the OFDM signal LS shown in FIG. 5, subcarriers included in a zone LK are the use subcarriers. That is, in the communication system 1, data transmission is performed with a data signal including transmission data being superimposed on, among the plurality of subcarriers included in the OFDM signal LS, the subcarriers included in a predetermined band in the zone LK. The predetermined band is a transmission band used for data transmission, and this transmission band includes the use subcarriers.

On the other hand, the subcarriers that are given numbers more than N/2−1 are subcarriers not used for data transmission (which will be also referred to as "non-use subcarrier" or "non-transmission subcarrier"). In the communication, zero is superimposed on the non-use subcarriers.

Thus, in the communication system 1, data transmission is performed by using the subcarriers that are given numbers equal to or less than N/2−1 and included in the transmission band, where N subcarriers included in the OFDM signal are numbered by integers from 0 to N−1 in ascending order with respect to the frequency of each subcarrier. This enables the transmission data to be restored in the receiver side even in a case where a signal of a real number part of the baseband OFDM signal obtained as a result of the IFFT process is used as the communication signal. In a precise sense, N is a power of two, which is an even number.

The transmission band mentioned above may be limited by a band (a use band based on the standard) that is used when power line communication specified by the standard is performed. More specifically, in the band including the subcarriers given the numbers equal to or less than N/2−1, a portion not included in the use band based on the standard cannot be used for data transmission. Accordingly, in a case where the band including the subcarriers given the numbers equal to or less than N/2−1 contains a portion not included in the use band based on the standard, a band obtained by removing the portion not included in the use band based on the standard from the band including the subcarriers given the numbers equal to or less than N/2−1 serves as the transmission band. In other words, a band that is included in the band based on the standard and that includes the subcarriers given the numbers equal to or less than N/2−1 serves as the transmission band.

[5. Principle of Restoration of Transmission Data]

Figure 8:
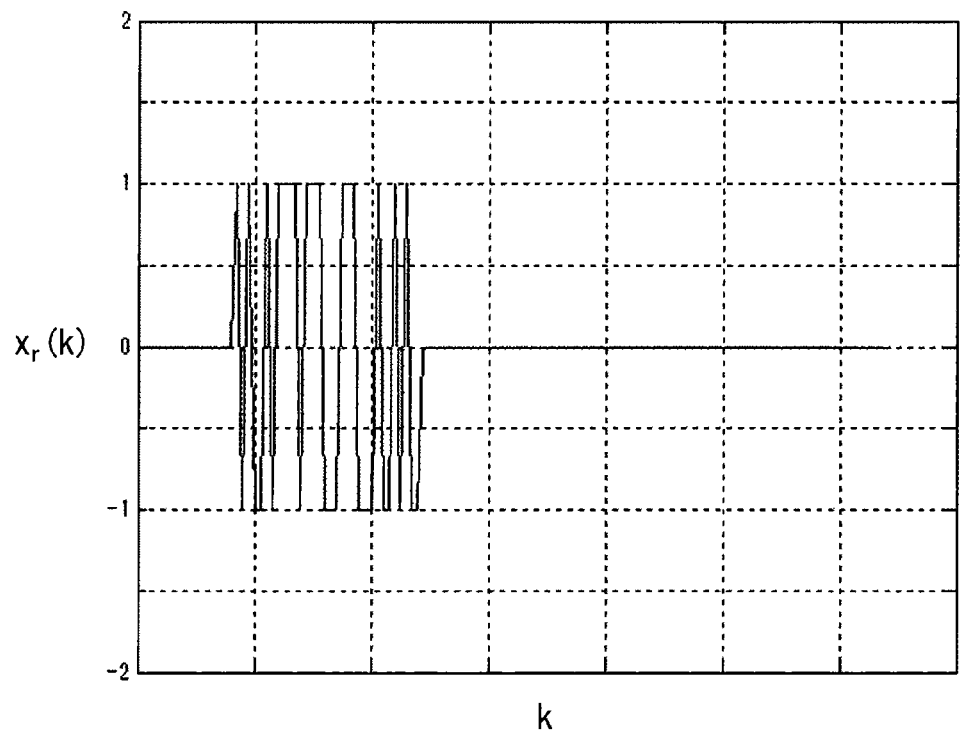
FIG. 8 A diagram showing data that has been used for computer simulation.
Figure 9:
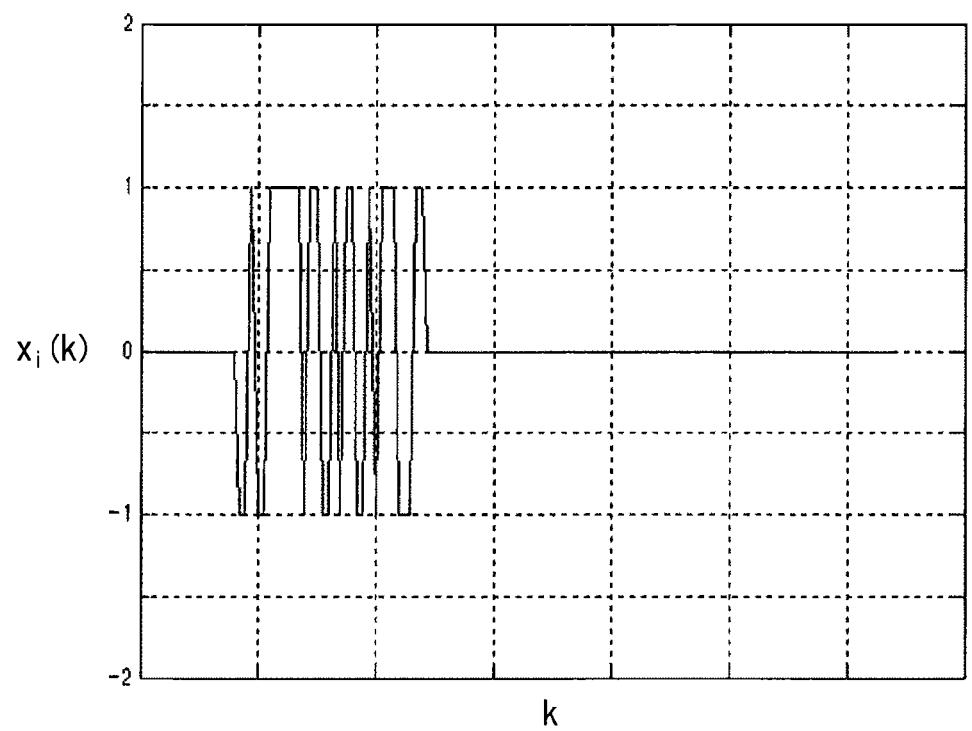
FIG. 9 A diagram showing data that has been used for computer simulation.

Next, the principle of restoration of transmission data will be described. FIG. 6 is a conceptual diagram showing that an input signal inputted to the IFFT unit is an even function. FIG. 7 is a conceptual diagram showing that an input signal inputted to the IFFT unit is an odd function. FIGS. 8 and 9 are diagrams showing data that has been used for computer simulation. FIGS. 10 to 12 are diagrams showing a result of the computer simulation.

The theory of Fourier transform includes a theorem that "when an input to an FFT unit is an even function of a real number, an output from the FFT unit is an even function of a real number, and when the input is an odd function of a real number, an output from the FFT unit is an odd function of an imaginary number". Since FFT computation and IFFT computation are contrapositive to each other, this theorem applies not only to the FFT computation but also to the IFFT computation.

The following expressions (1) and (2) are mathematical expressions of the theorem concerning the IFFT computation.

[Math. 1]

$$h_e(k) \stackrel{IFFT}{\Longrightarrow} R_e(n) = \sum_{k=0}^{N/2-1} 2h_e(k)\cos\left(\frac{2\pi nk}{N}\right) \quad (1)$$

[Math. 2]

$$h_o(k) \stackrel{IFFT}{\Longrightarrow} jI_o(n) = j\sum_{k=0}^{N/2-1} 2h_o(k)\sin\left(\frac{2\pi nk}{N}\right) \quad (2)$$

In the expression (1), $h_e(k)$ represents an even function of a real number before the IFFT process, and $h_o(k)$ represents an odd function of a real number before the IFFT process. The expression (1) indicates a transform from an $h_e(k)$ signal at the point N into an $R_e(n)$ signal at the point N. The expression (2) indicates a transform from an $h_o(k)$ signal at the point N into an $I_e(n)$ signal at the point N.

Here, under the condition that a complex signal x(k) is inputted to the IFFT unit, a real part of the complex signal is an even function, and an imaginary part of the complex signal is an odd function; the following expression (3) is established based on the expressions (1) and (2).

[Math. 3]

$$x(k) = \quad (3)$$
$$x_e(k) + jx_o(k) \stackrel{IFFT}{\Longrightarrow} X(n) = \sum_{k=0}^{N/2-1} 2\left[x_e(k)\cos\left(\frac{2\pi nk}{N}\right) - x_o(k)\sin\left(\frac{2\pi nk}{N}\right)\right]$$

The expression (3) indicates that, when a real part of a complex signal inputted to the IFFT unit is an even function and an imaginary part thereof is an odd function, an output of the IFFT unit is a real-number signal. In a case where an output signal outputted from the IFFT unit is a real-number signal, it is not necessary to perform quadrature modulation on the output signal outputted from the IFFT unit. Thus, the output signal outputted from the IFFT unit can be used, without any change added thereto, as the communication signal which will be transmitted to the outside.

Since the IFFT computation is computation performed on a signal at the point N, the definitions of the even function and the odd function are slightly different from the mathematical definitions. More specifically, in the IFFT computation, the even function means that N data units are symmetrical with respect to the line passing through the center point (lateral-symmetrical with respect to the center point), as shown in FIG. 6. In the mathematical expression, it is expressed as h(n)=h(N−n). In the IFFT computation, the odd function means that N data units are point-symmetrical with respect to the center point, as shown in FIG. 7. In the mathematical expression, it is expressed as h(n)=−h(N−n).

As described above, in order that the output of the IFFT unit be a real-number signal, it is necessary that a real part of the complex signal inputted to the IFFT unit is an even function while an imaginary part thereof is an odd function. A situation where a real part and an imaginary part of the input signal inputted to the IFFT unit is an even function and an odd function, respectively, corresponds to a situation where each of a real part and an imaginary part of the input signal has a symmetric property.

In this manner, when a data signal having the symmetric property is inputted to the IFFT unit, an output of a real-number signal from the IFFT unit can be obtained theoretically.

In a transmitter, however, a signal obtained as a result of the IFFT process is subjected to a band-pass filter, in order to limit expansion of a band used for communication. When a data signal having the symmetric property is inputted to the IFFT unit and a signal obtained as a result of the IFFT process is subjected to the band-pass filter, a distortion occurs in a communication signal because of an influence of non-ideal characteristics of the band-pass filter, which may impair the symmetric property of the data signal. In a case where the symmetric property of the data signal is impaired, the receiver 20 receives the data signal having no symmetric property and therefore the transmission data cannot be restored.

Accordingly, in the transmitter 10 of this embodiment, the data signal is superimposed on the subcarriers that are given numbers equal to or less than N/2−1, where the N subcarriers included in the OFDM signal are numbered by integers from 0 to N−1 in ascending order with respect to the frequency of each subcarrier. The transmitter 10 performs communication without superimposing the data signal on the subcarriers that are given the numbers more than N/2−1.

Not superimposing the data signal on, among all the subcarriers, the subcarriers not included in the transmission band can limit a band of the communication signal outputted from the transmitter 10. Thus, the need for the band-pass filter is eliminated.

Since the need for the band-pass filter is eliminated, data transmission can be performed without causing any distortion in the communication signal.

In a case where the subcarriers not included in the transmission band among all the subcarriers serve as non-use subcarriers, it is impossible that a data signal having the symmetric property is inputted to the IFFT unit 116. Therefore, an output of the IFFT unit 116 is a complex signal including a real part and an imaginary part.

Here, assuming that a real part of the complex signal outputted from the IFFT unit 116 as a result of an input of a data signal to the IFFT unit 116 under the condition that the subcarriers not included in the transmission band among all the subcarriers serve as non-use subcarriers has the same shape as the shape of a real-number signal outputted from an IFFT unit as a result of an input of a data signal having the symmetric property to the IFFT unit; transmitting the real part of the complex signal outputted from the IFFT unit 116 enables the receiver side to restore the transmission data.

In the following, an examination will be made about whether or not the receiver side is able to restore the transmission data in a case where the transmission data is transmitted under the condition that the subcarriers not included in the transmission band among all the subcarriers serve as non-use subcarriers.

Firstly, the input signal x(k) inputted to the IFFT unit 116 is defined as the following expression (4).

[Math. 4]

$$x(k) = \begin{cases} x_r(k) + jx_i(k) & 0 \le k \le \frac{N}{2} - 1 \\ 0 & \frac{N}{2} \le k \le N - 1 \end{cases} \quad (4)$$

In the expression (4), N represents the number of subcarriers included in the OFDM signal.

Performing the IFFT process on the signal x(k) indicated by the expression (4) results in a signal X(n) obtained as a result of the IFFT process as indicated by the expression (5).

[Math. 5]

$$X(n) = \sum_{k=0}^{N-1} [x_r(k) + jx_i(k)] e^{j\frac{2\pi nk}{N}} \quad (5)$$

Developing and reconfiguring the expression (5) to divide it into a real part and an imaginary part results in the expression (6). Here, since x(k)=0 is obtained in a case of N/2≤k≤N−1 based on the expression (4), the expression (6) is expressed into the expression (7).

[Math. 6]

$$X(n) = \sum_{k=0}^{N-1} \left[ x_r(k)\cos\left(\frac{2\pi nk}{N}\right) - x_i(k)\sin\left(\frac{2\pi nk}{N}\right) \right] + \quad (6)$$
$$j \left\{ \sum_{k=0}^{N-1} \left[ x_r(k)\sin\left(\frac{2\pi nk}{N}\right) + x_i(k)\cos\left(\frac{2\pi nk}{N}\right) \right] \right\}$$

[Math. 7]

$$X(n) = \sum_{k=0}^{N/2-1} \left[ x_r(k)\cos\left(\frac{2\pi nk}{N}\right) - x_i(k)\sin\left(\frac{2\pi nk}{N}\right) \right] + \quad (7)$$
$$j \left\{ \sum_{k=0}^{N/2-1} \left[ x_r(k)\sin\left(\frac{2\pi nk}{N}\right) + x_i(k)\cos\left(\frac{2\pi nk}{N}\right) \right] \right\}$$

Based on the expression (7), a real part $X_R(n)$ of the signal X(n) obtained after the IFFT process is expressed by the expression (8).

[Math. 8]

$$X_R(n) = \sum_{k=0}^{N/2-1} \left[ x_r(k)\cos\left(\frac{2\pi nk}{N}\right) - x_i(k)\sin\left(\frac{2\pi nk}{N}\right) \right] \quad (8)$$

The expression (8) is identical to the expression (3), except that the amplitude is half. The signal x(k) indicated by the expression (4) is not a signal having the symmetric property, but it can be regarded as a signal substantially having the symmetric property, because x(k)=0 is obtained in a case of N/2≤k≤N−1.

Therefore, in a case where the real-part signal $X_R(n)$ expressed by the expression (8) among the signal $X(n)$ obtained as a result of the IFFT process is transmitted as the communication signal, the receiver 20 is able to generate the signal x(k) based on the relationship indicated by the expression (3) by performing the FFT process on the communication signal $X_R(n)$. Thus, the receiver 20 is able to restore the transmission data.

FIGS. 8 to 12 which will be described below show a result of the computer simulation. FIG. 8 shows a real part $x_r(k)$ of the input signal x(k) inputted to the IFFT unit 116. FIG. 9 shows an imaginary part $x_i(k)$ of the input signal x(k) inputted to the IFFT unit 116. FIG. 10 shows a real-part signal $X_R(n)$ obtained as a result of the IFFT process. FIG. 11 shows a real part $x'_r(k)$ of the signal x(k) that is restored by the FFT process being performed on the real-part signal $X_R(n)$ obtained as a result of the IFFT process. FIG. 12 shows an imaginary part $x'_i(k)$ of the signal x(k) that is restored by the FFT process being performed on the real-part signal $X_R(n)$ obtained as a result of the IFFT process.

Comparing between FIGS. 8 and 11 and comparison between FIG. 9 and FIG. 12, it is found from a result of the computer simulation, too, that the input signal x(k) before the IFFT process can be restored by the FFT process being performed on the real-part signal $X_R(n)$ obtained as a result of the IFFT process.

In this manner, in the communication system 1 of this embodiment, the receiver 20 is able to restore transmission data even when data transmission is performed by using subcarriers that are given numbers equal to or less than N/2−1, where the N subcarriers included in the OFDM signal are numbered by integers from 0 to N−1 in ascending order with respect to the frequency of each subcarrier.

In the transmitter 10 of the communication system 1 described above, the communication signal that is based on the real-part signal obtained by removing the imaginary-part signal is transmitted without any quadrature modulation being performed thereon. Therefore, a configuration for performing the quadrature modulation need not be provided in the transmitter 10. This can downsize the transmitter 10, and achieves cost reduction and power saving.

The receiver 20 receives the real-number signal on which no quadrature modulation has been performed by the transmitter 10. Accordingly, a configuration for quadrature detection and a low pass filter for removing a signal of a high frequency component generated by quadrature detection need not be provided in the receiver 20. This can downsize the receiver 20, and achieves cost reduction and power saving.

The transmitter 10 performs communication without superimposing the data signal on, among all the subcarriers, the subcarriers included in the non-transmission band that are given the numbers more than N/2−1. Accordingly, the band-pass filter for limiting a band of the communication signal can be omitted from the transmitter 10. This can downsize the transmitter 10, and achieves cost reduction.

In the description above, the data signal is assigned to the subcarriers given the numbers equal to or less than N/2−1 while the data signal is not assigned to the subcarriers given the numbers more than N/2−1, in order to cause an input signal inputted to the IFFT unit 116 to be a substantially lateral-symmetrical signal. Here, the assignment of the data signal to the subcarriers may be reversed. That is, it may be acceptable that the data signal is assigned to the subcarriers given the numbers more than N/2−1 while the data signal is not assigned to the subcarriers given the numbers equal to or less than N/2−1, to thereby obtain a substantially lateral-symmetrical signal as an input signal to be inputted to the IFFT unit 116.

[6. Data Arrangement Pattern Used for Generation of Preamble Signal]

Next, a detailed description will be given to a data arrangement pattern for arranging data to the subcarriers, which is used for generation of the preamble signal.

FIG. 13 is a diagram showing an example of a data arrangement pattern $PT_S$ used for generation of the STF 51S. FIG. 14 is a diagram showing a waveform of the STF 51S generated by using the data arrangement pattern $PT_S$ shown in FIG. 13. FIG. 15 is a diagram showing an example of a data arrangement pattern $PT_L$ used for generation of the LTF 51L.

To generate the STF 51S included in the preamble 51, a data arrangement pattern that is set in accordance with the following setting rules (Rs1) to (Rs4) is adopted.

(Rs1) A preamble data signal of the real number should be arranged in a subcarrier in the transmission band.

(Rs2) The STF 51S should have cyclicity with several cycles.

(Rs3) The ratio of the maximum power to the average power (PAPR: Peak to Average Power Ratio) should be close to one.

(Rs4) The power (electric power) of the STF 51S is higher by 6 dB than the power of the OFDM symbol including the transmission data.

The setting rule (Rs1) is a prerequisite for transmitting information included in the STF 51S to the receiver 20.

The STF 51S having cyclicity with several cycles in accordance with the setting rule (Rs2) enables earlier detection of the preamble signal. To be specific, the preamble signal detection process in the receiver 20 is performed based on whether or not the same signal has been detected by using the correlation computation. Accordingly, in a case where one STF has one cycle, the preamble signal cannot be detected unless one or more STF is received. In this embodiment, one STF 51S has several cycles, and therefore detection of the preamble signal can be made within one STF 51S. This enables earlier detection of the preamble signal.

In the correlation computation, a previously received signal is stored in a buffer for a while and thereby delayed, and the previously received signal and a subsequently received signal are used for the correlation computation. Since one STF 51S has cyclicity with several cycles, the capacity of the buffer for storing received signals can be reduced. For example, when one STF has cyclicity with one cycle, the one STF needs to be stored in order to perform the correlation computation, and a buffer having the capacity of storing at least the one STF is required. When one STF 51S has cyclicity with several cycles as in this embodiment, the amount of signal data necessary for performing the correlation computation is reduced. Thus, the capacity of the buffer can be reduced.

In this embodiment, one STF 51S has cyclicity with four cycles. This is set in consideration of the balance between the degree of achievement of the correlation computation and a demand for reduction in the capacity of the buffer, because too short a cycle cannot provide correlation and a longer cycle increases the capacity of the buffer.

The setting rule (Rs3) is a condition for making it easy to design an amplifier (amp) for amplifying the transmission signal. More specifically a transmitter for transmitting the OFDM signal is designed such an the amplifier has a wide dynamic range (a range between the minimum and the maximum of the signal amplitude) so that no distortion occurs in a signal. Therefore, the PAPR of the STF being close to one makes designing of the amplifier easy.

The setting rule (Rs4) is a condition for increasing the S/N ratio to facilitate the detection of the preamble signal.

FIG. 13 illustrates a data arrangement pattern $PT_S$ that is set in accordance with the four setting rules (Rs1) to (Rs4) described above.

The data arrangement pattern $PT_S$ indicates that the preamble data signals of "2.82×2" are superimposed on the subcarrier No. 78, the subcarrier No. 86, and the subcarrier No. 102, and the preamble data signal of "−2.82×2" is superimposed on the subcarrier No. 94; where 128 subcarriers are numbered by integers from 0 to 127 in ascending order with respect to the center frequency of each subcarrier. The data arrangement pattern $PT_S$ can be also regarded as indicating that zero is superimposed on, among the 128 subcarriers, subcarriers having no preamble data signal superimposed thereon.

In the STF 51S generated by using the data arrangement pattern $PT_S$, the bandwidth is 131.25 kHz to 356.25 kHz, the PAPR is 1.69, and the number of cycles is four. The power of the STF 51S is higher by 6 dB than the power of the OFDM symbol for transmitting the transmission data.

In the following, a detailed description will be given to procedures of setting the data arrangement pattern by taking, as an example, a case of setting the data arrangement pattern $PT_S$ shown in FIG. 13. Here, it is assumed that the communication system that adopts, as the preamble signal, the STF 51S generated by using the data arrangement pattern $PT_S$ shown in FIG. 13 performs communication by means of an OFDM signal including 128 subcarriers, and adopts the QPSK modulation scheme as a primary modulation scheme.

The data arrangement pattern can be set through the following setting procedures (Js1) to (Js5).

To be specific, in the setting procedure (Js1), subcarriers to be used are identified in accordance with the transmission band.

In a case of setting the data arrangement pattern $PT_S$ shown in FIG. 13, the subcarriers included in a band of 103.125 kHz to 393.75 kHz are identified. The subcarriers included in a band of 103.125 kHz to 393.75 kHz are 32 subcarriers in total, namely, the subcarrier No. 75 to the subcarrier No. 106. Thus, the 32 subcarriers are identified as the subcarriers to be used.

In the next setting procedures (Js2), the positions and the number of subcarriers on which the preamble data signal is superimposed are determined, in order to obtain cyclicity within one STF 51S.

The theory of Fourier transform includes the theorem that "when an input to an FFT unit is an even function of a real number, an output from the FFT unit is an even function of a real number", as described above.

Since the preamble data signal is the real number, the signal in the frequency domain (the STF in the frequency domain before the IFFT process is performed) obtained by arranging the preamble data signal in the subcarriers in accordance with the data arrangement pattern is a real-number signal. The real-number signal is obtained by arranging the preamble data signal in the subcarriers included in the transmission band. Therefore, the real-number signal can be regarded as a signal substantially having symmetricity. Thus, the STF in the frequency domain before the IFFT process is performed can be regarded as an even function of a real number. A signal obtained by taking a real part from the signal in the time domain that is generated as a result of the IFFT process being performed on the STF in the frequency domain is an even function that is laterally symmetrical in a period corresponding to one OFDM symbol.

Applying "0" to the imaginary part $x_i(k)$ of the input signal x(k) inputted to the IFFT unit 116 in the expression (8) results in the same form as that of the expression (1) that expresses the theorem that "when an input to an IFFT unit is an even function of a real number, an output from the IFFT unit is an even function of a real number". From this fact, too, it is proved that the real-part signal obtained after the IFFT process is an even function that is laterally symmetrical in a period corresponding to one OFDM symbol.

Furthermore, in a case where, in subcarriers given consecutive numbers (sequential number subcarriers), the preamble data signal is arranged in subcarriers that are at regular intervals and spaced apart from one another by an odd number of subcarriers, and additionally the number of subcarriers in which the preamble data signal is arranged is an even number; the symmetricity can be obtained in the left half or the right half of one OFDM symbol, too.

In the data arrangement pattern $PT_S$ shown in FIG. 13, the preamble data signal is arranged in, among consecutive subcarriers included in the transmission band, subcarriers that are at regular intervals and spaced apart from one another by seven subcarriers, and additionally the number of subcarriers in which the preamble data signal is arranged is four. The STF 51S, which is generated by using this data arrangement pattern $PT_S$, is a four-fold symmetry signal as shown in FIG. 14.

Performing correlation computation on such a four-fold symmetry signal results in the absolute value that is equal to the absolute value obtained as a result of correlation computation being performed on a signal having four cycles. The above description states that the STF 51S is a signal having cyclicity for convenience of the description, but to be exact, the STF 51S is a signal having symmetricity.

In the next setting procedure (Js3), a reference amplitude of the preamble data signal, at which the power of the STF 51S is equal to the power of the OFDM symbol for transmitting the transmission data, is calculated.

For example, a case is assumed in which the number of subcarriers included in the transmission band is 32 and a data signal having an amplitude of "1" on which a primary modulation has been performed in the QPSK modulation scheme is superimposed on the 32 subcarriers, to generate an OFDM symbol. In this case, power $P_D$ of the OFDM symbol is "32", as shown in the expression (9).

[Math. 9]

$$P_D = \sum_{n=1}^{32}(I_n^2 + Q_n^2) = \sum_{n=1}^{32}\left(\frac{1}{2} + \frac{1}{2}\right) = 32 \qquad (9)$$

As for the STF 51S, the number of subcarriers on which the preamble data signal is superimposed is four, and therefore power $P_S$ of the STF 51S is "4" provided that the preamble data signal is a signal with its real part I=1 and its imaginary part Q=0.

The ratio $P_D/P_S$ of the power $P_D$ of the OFDM symbol to the power $P_S$ of the STF 51S is 32/4=8. Since the square of the voltage or current value is equivalent to the power, the reference amplitude of the preamble data signal, at which the power $P_S$ of the STF 51S is equal to the power $P_D$ of the OFDM symbol, is 2.82, which is the square root of 8.

The next setting procedure (Js4) determines a coefficient by which the reference amplitude is multiplied in order to cause the power $P_S$ of the STF 51S to be higher by 6 dB than the power $P_D$ of the OFDM symbol for transmitting the transmission data.

The coefficient for causing the power $P_S$ of the STF 51S to be higher by 6 dB than the power $P_D$ of the OFDM symbol for transmitting the transmission data is "2". Thus, setting the value (amplitude) of the preamble data signal to be 2.82×2 causes the power $P_S$ of the STF 51S to be higher by 6 dB than the power $P_D$ of the OFDM symbol for transmitting the transmission data, as shown in expression (10).

[Math. 10]

$$10 \log_{10}\{4 \times (2.82 \times 2)^2 / 32\} = 6 \text{ dB} \qquad (10)$$

In the setting procedure (Js5), a combination of codes of the preamble data signal that provides the lowest PAPR is selected.

Since the OFDM signal is a signal obtained as a result of superimposition of a plurality of subcarriers modulated by different data signals, there is a possibility that in-phase synthesis increases the PAPR. Therefore, a combination of codes of the preamble data signal is adjusted in order to avoid an increase in the PAPR.

In the data arrangement pattern $PT_S$ shown in FIG. 13, the number of subcarriers on which the preamble data signal is superimposed is four. Thus, the total number of combinations of codes of the preamble data signal is $2_{4=16}$. As a result of calculating the PAPR corresponding to the 16 combinations, the lowest PAPR was obtained when the code of the preamble signal superimposed on the 78th subcarrier is "+", the code of the preamble signal superimposed on the 86th subcarrier is "+", the code of the preamble signal superimposed on the 94th subcarrier is "−", and the code of the preamble signal superimposed on the 102nd subcarrier is "+".

Thus, in this embodiment, the data arrangement pattern for generating the STF 51S is set in accordance with the setting rules (Rs1) to (Rs4) described above.

Next, a data arrangement pattern used for generating the LTF 51L included in the preamble 51 will be described.

To generate the LTF 51L included in the preamble 51, a data arrangement pattern that is set in accordance with the following setting rules (RL1) to (RL4) is adopted.

(RL1) A preamble data signal of the real number should be arranged in a subcarrier in the transmission band.

(RL2) The ratio (PAPR) of the maximum power to the average power should be close to one.

(RL3) The preamble data signal should be a pseudo random binary (bit) sequence (PRBS: Pseudo Random Binary (Bit) Sequence).

Similarly to the setting rule (Rs1), the setting rule (RL1) is a prerequisite for transmitting information included in the LTF 51L to the receiver 20.

Similarly to the setting rule (Rs3) for the STF 51S, the setting rule (RL2) is a condition for making it easy to design an amplifier (amp) for amplifying the transmission signal.

The setting rule (RL3) is a condition for improving a channel estimation rate in the transmitter 10. Since the LTF 51L is used for estimation of the channel, it is preferable that the preamble data signal of the LTF 51L is a signal is not biased in both the frequency domain and the time domain. Accordingly, adoption of the PRBS as the preamble data signal can improve the channel estimation rate in the transmitter 10.

FIG. 15 illustrates a data arrangement pattern $PT_L$ that is set in accordance with the three setting rules (RL1) to (RL3) described above.

The data arrangement pattern $PT_L$ indicates that the preamble data signals of "1" are superimposed on the subcarrier No. 75, the subcarrier No. 78, the subcarrier No. 80, the subcarrier No. 81, the subcarrier No. 82, the subcarrier No. 85, the subcarrier No. 86, the subcarrier No. 87, the subcarrier No. 92, the subcarrier No. 94, the subcarrier No. 95, the subcarrier No. 96, the subcarrier No. 104, and the subcarrier No. 105, and the preamble data signals of "−1" are superimposed on the subcarrier No. 76, the subcarrier No. 77, the subcarrier No. 79, the subcarrier No. 83, the subcarrier No. 84, the subcarrier No. 88, the subcarrier No. 89, the subcarrier No. 90, the subcarrier No. 91, the subcarrier No. 93, the subcarrier No. 97, the subcarrier No. 98, the subcarrier No. 99, the subcarrier No. 100, the subcarrier No. 101, the subcarrier No. 102, the subcarrier 103, and the subcarrier No. 106, where 128 subcarriers are numbered by integers from 0 to 127 in ascending order with respect to the center frequency of each subcarrier. The data arrangement pattern $PT_L$ can be also regarded as indicating that zero is superimposed on, among the 128 subcarriers, subcarriers having no preamble data signal superimposed thereon.

In the LTF 51L generated by using the data arrangement pattern $PT_L$, the bandwidth is 103.125 kHz to 393.75 kHz and the PAPR is 1.96.

[7. Detailed Configuration of Preamble Detection Unit 202 of Receiver 20]

Next, a detailed description will be given to a configuration of the preamble detection unit 202 (FIG. 4) included in the receiver 20. FIG. 16 is a diagram showing a configuration of a correlation computation part 22 provided in the preamble detection unit 202.

The preamble detection unit 202 includes a correlation computation part 22 that performs correlation computation on the reception signal outputted from the reception unit 201.

More specifically, as shown in FIG. 16, the correlation computation part 22 includes a delay circuit 221, two multiplier circuits 222, 223, two moving average filters 224, 225, and a divider circuit 226.

In the correlation computation part 22, the reception signal is inputted to each of the delay circuit 221 and the two multiplier circuits 222, 223.

The delay circuit 221 delays the reception signal by a predetermined time M, and outputs a resultant signal. The delay time M can be set to be a natural number times the number of cycles of the STF 51S. However, an increase in the value M causes a larger delay. Therefore, herein, M is set so as to correspond to one cycle of the STF 51S (M=32 samples). The set value of M is known, and given in advance to the receiver 20.

The multiplier circuit 222 multiplies the output of the delay circuit 221 by the reception signal, and a result of the multiplication is inputted to the moving average filter 224.

The moving average filter 224 computes the moving average of an input signal (that is, the output of the multiplier circuit 222) over a predetermined time range, and outputs a result of the computation to the divider circuit 226.

The multiplier circuit 223 multiplies reception signals by each other, and outputs a result of the multiplication to the moving average filter 225.

The moving average filter 225 computes the moving average of the output of the multiplier circuit 223, and outputs a result of the computation to the divider circuit 226.

The divider circuit 226 divides the output of the moving average filter 224 and the output of the moving average filter 225 by each other, to thereby perform normalization, and outputs a signal obtained as a result of the division as a result of the correlation computation.

The preamble detection unit 202 extracts the amplitude of the output signal obtained from the correlation computation part 22 described above, and compares the amplitude against a predetermined threshold value, to determine whether or not the preamble signal has been detected.

As described above, the preamble signal outputted from the preamble output unit 119 of the transmitter 10 is a real-part signal obtained by removing an imaginary-part signal from a signal in the time domain that is generated as a result of the IFFT process being performed on a signal in the frequency domain obtained in accordance with the data arrangement patterns $PT_S$ and $PT_L$. The transmitter 10 adds the preamble signal to the OFDM signal including the transmission data, to form a packet signal, and transmits the packet signal as a communication signal. Accordingly, the preamble signal included in the communication signal is a real-number signal having no quadrature modulation performed thereon, and the receiver 20 performs no quadrature detection on the preamble signal received.

In a case where the preamble signal is a complex signal, it is necessary that a complex conjugate circuit for generating a complex conjugate signal of the reception signal is provided in the correlation computation part of the receiver. In this respect, the receiver 20 of this embodiment receives a preamble signal of a real number, and therefore no complex conjugate circuit is necessary in the correlation computation part 22. This can reduce a circuit size in the preamble detection unit 202 of the receiver 20, and also achieves a cost reduction.

In a case of performing quadrature detection on the preamble signal received, it is necessary that a complex conjugate circuit for generating a complex conjugate signal of the reception signal is provided in the correlation computation part of the receiver, because a preamble signal obtained after the quadrature detection is a complex signal.

In this respect, the receiver 20 of this embodiment performs no quadrature detection on the preamble signal received, and therefore the preamble signal is a real-number signal. Accordingly, no complex conjugate circuit is necessary in the correlation computation part 22. This can reduce a circuit size in the preamble detection unit 202 of the receiver 20, and also achieves a cost reduction.

As thus far described, in the communication system 1 including the transmitter 10 and the receiver 20, the transmitter 10 includes the generation means for generating the transmission signal including the transmission data, and the transmission means for transmitting the packet signal that is obtained by adding the preamble signal to the transmission signal. The transmission means transmits the packet signal without performing quadrature modulation thereon. The preamble signal is an OFDM signal including a plurality of subcarriers. The preamble signal is a real-part signal obtained by removing an imaginary-part signal from a signal in the time domain that is generated as a result of the IFFT process being performed on a signal in the frequency domain obtained by assigning the preamble data to the subcarriers in accordance with a predetermined arrangement pattern. The predetermined arrangement pattern indicates that the preamble data is assigned to any of subcarriers given numbers equal to or less than N/2−1 and the preamble data is not assigned to subcarriers given numbers more than N/2−1, or that the preamble data is assigned to any of subcarriers given numbers more than N/2−1 and the preamble data is not assigned to subcarriers given numbers equal to or less than N/2−1, where the plurality of subcarriers are numbered by integers from 0 to N−1 (N is an integer) in ascending order with respect to the center frequency of each subcarrier.

In the communication system 1, the receiver 20 includes the reception unit 201 that receives the packet signal, and the preamble detection unit 202 that detects the preamble signal included in the packet signal. The preamble detection unit 201 detects the preamble signal by using a correlation computation result that is obtained by performing correlation computation on the packet signal. The preamble detection unit 201 does not include a complex conjugate unit that generates a complex conjugate signal of the received preamble signal.

In the communication system 1 having such a configuration, the packet signal transmitted from the transmitter 10 is a real-number signal having no quadrature modulation performed thereon, and therefore it is not necessary that a configuration for performing quadrature detection and a complex conjugate unit for generating a complex conjugate signal of the received preamble signal are provided in the receiver 20. This can reduce the number of parts. The reduction in the number of parts can downsize the receiver 20 and achieves a cost reduction, and also achieves power saving.

<Modification>

Although an embodiment has been described above, the present invention is not limited to the above-described embodiment.

For example, in an example illustrated in the embodiment above, the transmitter 10 and the receiver 20 of the communication system 1 are configured to communicate with each other via wired communication, but it is not limiting. More specifically, the transmitter 10 and the receiver 20 may be configured to communicate with each other via wireless communication. In a case where they are configured to communicate with each other via wireless communication, the transmitter 10 is configured to include a frequency conversion unit for converting a baseband OFDM signal into a carrier-band OFDM signal, but a quadrature modulation unit is not necessary. On the other hand, the receiver 20 is configured to include a frequency conversion unit for converting a carrier-band OFDM signal into a baseband OFDM signal, but a quadrature detection unit is not necessary.

While the invention has been described in detail, the foregoing description is in all aspects illustrative and not restrictive. It is therefore understood that numerous modifications and variations not illustrated herein can be devised without departing from the scope of the invention.

DESCRIPTION OF THE REFERENCE NUMERALS 1 communication system
20 receiver (communication device)
10 transmitter (communication device)
119 preamble output unit
120 packet configuration unit
121 transmission unit
201 reception unit
202 preamble detection unit
22 correlation computation part

The invention claimed is:
1. A communication device comprising:
a transmitter configured to generate a transmission signal including transmission data;
transmit a packet signal obtained by adding a preamble signal to said transmission signal,
said preamble signal being an OFDM signal including a plurality of subcarriers,
said preamble signal being a real-part signal obtained by removing an imaginary-part signal from a signal in time domain that is generated by an IFFT process being performed on a signal in frequency domain obtained by assigning preamble data to subcarriers in accordance with a predetermined arrangement pattern,
said predetermined arrangement pattern indicating
that said preamble data is assigned to any of subcarriers given numbers equal to or less than N/2−1 and said preamble data is not assigned to subcarriers given numbers more than N/2−1, or
that said preamble data is assigned to any of subcarriers given numbers more than N/2−1 and said preamble data is not assigned to subcarriers given numbers equal to or less than N/2−1, and
where said plurality of subcarriers are numbered by integers from 0 to N−1 (N is an integer) in ascending order with respect to the center frequency of each subcarrier; and
transmit said packet signal without performing quadrature modulation thereon.

2. The communication device according to claim 1, wherein
said preamble signal includes a short preamble signal corresponding to one OFDM symbol as a unit,
a predetermined arrangement pattern for said short preamble signal indicates that said preamble data is assigned to, in subcarriers that are given consecutive numbers, an even number of subcarriers that are at regular intervals and spaced apart from one another by an odd number of subcarriers.

3. The communication device according to claim 1, wherein
said preamble signal includes a short preamble signal corresponding to one OFDM symbol as a unit,
a predetermined arrangement pattern for said short preamble signal indicates that said preamble data is assigned to subcarriers such that the PAPR (Peak to Average Power Ratio) of said short preamble signal is close to one.

4. The communication device according to claim 1, wherein
said preamble signal includes a short preamble signal corresponding to one OFDM symbol as a unit,
a predetermined arrangement pattern for said short preamble signal indicates that said preamble data is assigned to subcarriers such that power of said short preamble signal is higher by 6 dB than power of said transmission signal of one OFDM symbol.

5. The communication device according to claim 1, wherein
said preamble signal includes a long preamble signal corresponding to one OFDM symbol as a unit,
a predetermined arrangement pattern for said long preamble signal indicates that said preamble data is assigned to subcarriers such that the PAPR of said long preamble signal is close to one.

6. The communication device according to claim 1, wherein
said preamble signal includes a long preamble signal corresponding to one OFDM symbol as a unit,
a predetermined arrangement pattern for said long preamble signal indicates that said preamble data that is a PRBS (Pseudo Random Binary (Bit) Sequence) is assigned to subcarriers.

7. A communication device comprising:
a transmitter configured to
a generation section configured to generate a transmission signal including transmission data;
a transmission section configured to transmit a packet signal obtained by adding a preamble signal to said transmission signal,
said preamble signal including a short preamble signal corresponding to one OFDM symbol as a unit,
said short preamble signal being a real-part signal obtained by removing an imaginary-part signal from a signal in time domain that is generated by an IFFT process being performed on a signal in frequency domain obtained by assigning preamble data to subcarriers included in said short preamble signal in accordance with a predetermined arrangement pattern, and
said predetermined arrangement pattern for said short preamble signal indicating that preamble data of "2.82× 2" is assigned to a subcarrier No. 78, a subcarrier No. 86, and a subcarrier No. 102, and preamble data of "−2.82×2" is assigned to a subcarrier No. 94, where 128 subcarriers included in said short preamble signal are numbered by integers from 0 to 127 in ascending order with respect to the center frequency of each subcarrier; and
transmit said packet signal without performing quadrature modulation.

8. A communication device comprising:
a transmitter configured to
generate a transmission signal including transmission data;
transmit a packet signal obtained by adding a preamble signal to said transmission signal,
said preamble signal including a long preamble signal corresponding to one OFDM symbol as a unit,
said long preamble signal being a real-part signal obtained by removing an imaginary-part signal from a signal in time domain that is generated by an IFFT process being performed on a signal in frequency domain obtained by assigning preamble data to subcarriers included in said long preamble signal in accordance with a predetermined arrangement pattern, and
said predetermined arrangement pattern for said long preamble signal indicating that preamble data of "1" is assigned to a subcarrier No. 75, a subcarrier No. 78, a subcarrier No. 80, a subcarrier No. 81, a subcarrier No. 82, a subcarrier No. 85, a subcarrier No. 86, a subcarrier No. 87, a subcarrier No. 92, a subcarrier No. 94, a subcarrier No. 95, a subcarrier No. 96, a subcarrier No. 104, and a subcarrier No. 105, and preamble data of "−1" is assigned to a subcarrier No. 76, a subcarrier No. 77, a subcarrier No. 79, a subcarrier No. 83, a subcarrier No. 84, a subcarrier No. 88, a subcarrier No. 89, a subcarrier No. 90, a subcarrier No. 91, a subcarrier No. 93, a subcarrier No. 97, a subcarrier No. 98, a subcarrier No. 99, a subcarrier No. 100, a subcarrier No. 101, a subcarrier No. 102, a subcarrier 103, and a subcarrier No. 106, where 128 subcarriers included in said long preamble signal are numbered by integers from 0 to 127 in ascending order with respect to the center frequency of each subcarrier; and
transmit said packet signal without performing quadrature modulation.

9. A communication device comprising:
a receiver configured to
   receive a packet signal;
   detect a preamble signal included in the packet signal,
said packet signal being a signal of a real number on which no quadrature modulation has been performed in a transmitter,
said receiver being configured to detect the preamble signal by using a correlation computation result that is obtained by performing correlation computation on said packet signal, and
said receiver not including a complex conjugate unit for generating a complex conjugate signal of the received preamble signal.

10. A communication system comprising:
a first communication device; and
a second communication device configured to communicate with said first communication device,
said first communication device including:
   a transmitter configured to
      generate a transmission signal including transmission data;
      transmit a packet signal obtained by adding a preamble signal to said transmission signal,
   said preamble signal being an OFDM signal including a plurality of subcarriers,
   said preamble signal being a real-part signal obtained by removing an imaginary-part signal from a signal in time domain that is generated by an IFFT process being performed on a signal in frequency domain obtained by assigning preamble data to subcarriers in accordance with a predetermined arrangement pattern,
   said predetermined arrangement pattern indicating
      that said preamble data is assigned to any of subcarriers given numbers equal to or less than N/2−1 and said preamble data is not assigned to subcarriers given numbers more than N/2−1, or
      that said preamble data is assigned to any of subcarriers given numbers more than N/2−1 and said preamble data is not assigned to subcarriers given numbers equal to or less than N/2−1, and
         where said plurality of subcarriers are numbered by integers from 0 to N−1 (N is an integer) in ascending order with respect to the center frequency of each subcarrier; and
         transmit said packet signal without performing quadrature modulation,
said second communication device including:
   a receiver configured to
      receive said packet signal; and
      detect said preamble signal included in said packet signal,
   said receiver being configured to detect the preamble signal by using a correlation computation result that is obtained by performing correlation computation on said packet signal,
   said receiver not including a complex conjugate unit for generating a complex conjugate signal of the received preamble signal.

\* \* \* \* \*